United States Patent
Lidar et al.

(10) Patent No.: US 11,308,400 B2
(45) Date of Patent: Apr. 19, 2022

(54) OPTIMALLY STOPPED OPTIMIZATION SYSTEMS HAVING HEURISTIC OPTIMIZER AND METHODS USING THE SAME

(71) Applicant: University of Southern California, Los Angeles, CA (US)

(72) Inventors: Daniel A. Lidar, La Canada, CA (US); Walter Vinci, Claremont, CA (US)

(73) Assignee: University of Southern California, Los Angeles, CA (US)

( * ) Notice: Subject to any disclaimer, the term of this patent is extended or adjusted under 35 U.S.C. 154(b) by 913 days.

(21) Appl. No.: 16/105,840

(22) Filed: Aug. 20, 2018

(65) Prior Publication Data

US 2019/0095799 A1    Mar. 28, 2019

Related U.S. Application Data

(60) Provisional application No. 62/547,448, filed on Aug. 18, 2017.

(51) Int. Cl.
| | |
|---|---|
| *G06N 5/00* | (2006.01) |
| *G06F 17/11* | (2006.01) |
| *G06F 17/18* | (2006.01) |
| *G06N 7/00* | (2006.01) |

(52) U.S. Cl.
CPC ............ *G06N 5/003* (2013.01); *G06F 17/11* (2013.01); *G06F 17/18* (2013.01); *G06N 7/005* (2013.01)

(58) Field of Classification Search
CPC ........ G06N 5/003; G06N 7/005; G06F 17/18; G06F 17/11
See application file for complete search history.

(56) References Cited

U.S. PATENT DOCUMENTS

| | | | |
|---|---|---|---|
| 2008/0147577 A1* | 6/2008 | Bi | G16H 30/40 706/12 |
| 2010/0293313 A1* | 11/2010 | Ferringer | G06N 3/086 710/110 |
| 2014/0172503 A1* | 6/2014 | Hammerstrom | G06Q 30/0206 705/7.31 |
| 2014/0372769 A1* | 12/2014 | Kerschbaum | H04L 9/008 713/189 |
| 2018/0196892 A1* | 7/2018 | Viana | G06F 30/20 |
| 2018/0260503 A1* | 9/2018 | Dweik | G06T 17/05 |

* cited by examiner

*Primary Examiner* — Michael Jung
(74) *Attorney, Agent, or Firm* — Brooks Kushman P.C.

(57) ABSTRACT

An optimally stopped heuristic optimizer includes a processor. The processor heuristically generates a sequence of proposed solutions for solving a discrete optimization problem associated with an objective function, and for each additional proposed solution of the sequence, derives an estimate of a quality distribution that is based on the sequence including the additional proposed solution. The quality distribution assigns a probability to each of the proposed solutions according to quality of the proposed solution. The processor further, responsive to a most recent additional proposed solution of the sequence having quality better than a quality threshold that is defined by the estimate corresponding to the sequence including the most recent additional proposed solution, commands a stop such that further proposed solutions to the discrete optimization problem are no longer generated, and identifies and outputs a selected one of the sequence having best quality.

12 Claims, 16 Drawing Sheets

OPTIMALLY STOPPED OPTIMIZATION SYSTEMS HAVING HEURISTIC OPTIMIZER AND METHODS USING THE SAME

CROSS-REFERENCE TO RELATED APPLICATION

This application claims the benefit of U.S. Provisional Application No. 62/547,448, filed Aug. 18, 2017, the contents of which are incorporated by reference in their entirety herein.

STATEMENT REGARDING FEDERALLY SPONSORED RESEARCH OR DEVELOPMENT

This invention was made with United States Government support under Army Research Office Grant No. W911NF-12-1-0523, Army Research Office Multidisciplinary University Research Initiative Grant Nos. W911NF-11-1-0268 and W911NF-15-1-0582, and National Science Foundation Grant No. INSPIRE-155.1064. The United States Government has certain rights in the invention.

TECHNICAL FIELD

This disclosure relates to the fields of heuristic optimization and optimal stopping.

BACKGROUND

The performance of optimization algorithms is typically assessed in terms of either solution quality or computational effort. In the case of randomized algorithms, these two quantities are random variables and their characterization is usually performed via careful statistical analyses of finite samples. A practical difficulty that one encounters in benchmarking optimization algorithms is that "solution quality" and "computational effort" are deeply intertwined. This difficulty seems to be one of the reasons why a consistent benchmarking methodology is lacking in the field of optimization algorithms.

The most common strategy for benchmarking is a "quality first" approach where one fixes a minimum target for the quality of an acceptable solution. Performance is then measured in terms of the time-to-target, e.g., the time to obtain an acceptable solution with a probability of 99%. The target quality is usually specified as a percentage of the quality of the global optimum. When the target is the global optimum itself the time-to-target reduces to the time-to-solution. The time-to-target is a very useful measure of performance, but it has several drawbacks. First, if the global optimum is unknown, the approach described above cannot be used and choosing an appropriate target can become problematic. Common strategies such as setting the target as the best-known solution, or as the best solution obtained by a competitive solver, involves an even larger number of arbitrary choices. Moreover, a time-to-target measure considers all the solutions whose cost is below that of the target as being equally good, thus ignoring precious information about the quality of solutions below the target.

In some cases, it may be convenient to follow a "time first" approach where one fixes the computation time. Performance is measured in terms of the target-in-time, e.g., the average quality of the best solution found in the given computational window. This approach does not require knowledge of the optimal solution. The length of the window can, however, greatly bias the comparison between different solvers: some solvers may find good quality solutions more quickly than others, but may require more time to find solutions that are very close to the global minimum.

SUMMARY

We propose a strategy for benchmarking randomized optimization algorithms that minimizes the expected total cost for obtaining a good solution with an optimal number of calls to the solver. To do so, rather than letting the objective function alone define a cost to be minimized, we introduce a further cost-per-call of the algorithm. We show that this problem can be formulated using optimal stopping theory. The expected cost is a flexible figure of merit for benchmarking probabilistic solvers that can be computed when the optimal solution is not known, and that avoids the biases and arbitrariness that affect other measures. The optimal stopping formulation of benchmarking directly leads to a real-time, optimal-utilization strategy for probabilistic optimizers with practical impact. We apply our formulation to MAX2SAT problems, and analyze the benchmarking results of simulated annealing, the D-Wave 2X quantum annealer, and a specialized classical heuristic algorithm designed for low tree-width graphs.

In an example, an optimally stopped heuristic optimizer includes a processor. The processor heuristically generates a sequence of proposed solutions for solving a discrete optimization problem associated with an objective function, and for each additional proposed solution of the sequence, derives an estimate of a quality distribution. The quality distribution is based on the sequence including the additional proposed solution, and assigns a probability to each of the proposed solutions according to quality of the proposed solution. The processor further, responsive to a most recent additional proposed solution of the sequence having quality better than a quality threshold that is defined by the estimate corresponding to the sequence including the most recent additional proposed solution, commands a stop such that further proposed solutions to the discrete optimization problem are no longer generated, and identifies and outputs a selected one of the sequence having best quality.

BRIEF DESCRIPTION OF THE DRAWINGS

FIG. 1B. Optimal total cost $C_c^*$ computed from the empirical energy distributions P of FIG. 1A, after subtracting the ground state energy $E_0$ for the given problem instance. The lower envelope gives the optimal number of spin updates per run $n_{sf}^*$ as a function of c. Error bars were computed via bootstrapping. The tail fit corresponds to values of the optimal total cost that fall into the lower tail (defined as the 0.1th percentile) of the energy distributions. Note that large errors due to the under-sampling of the lower tail do not imply large errors in the large c region.

DETAILED DESCRIPTION

Figure 1A:
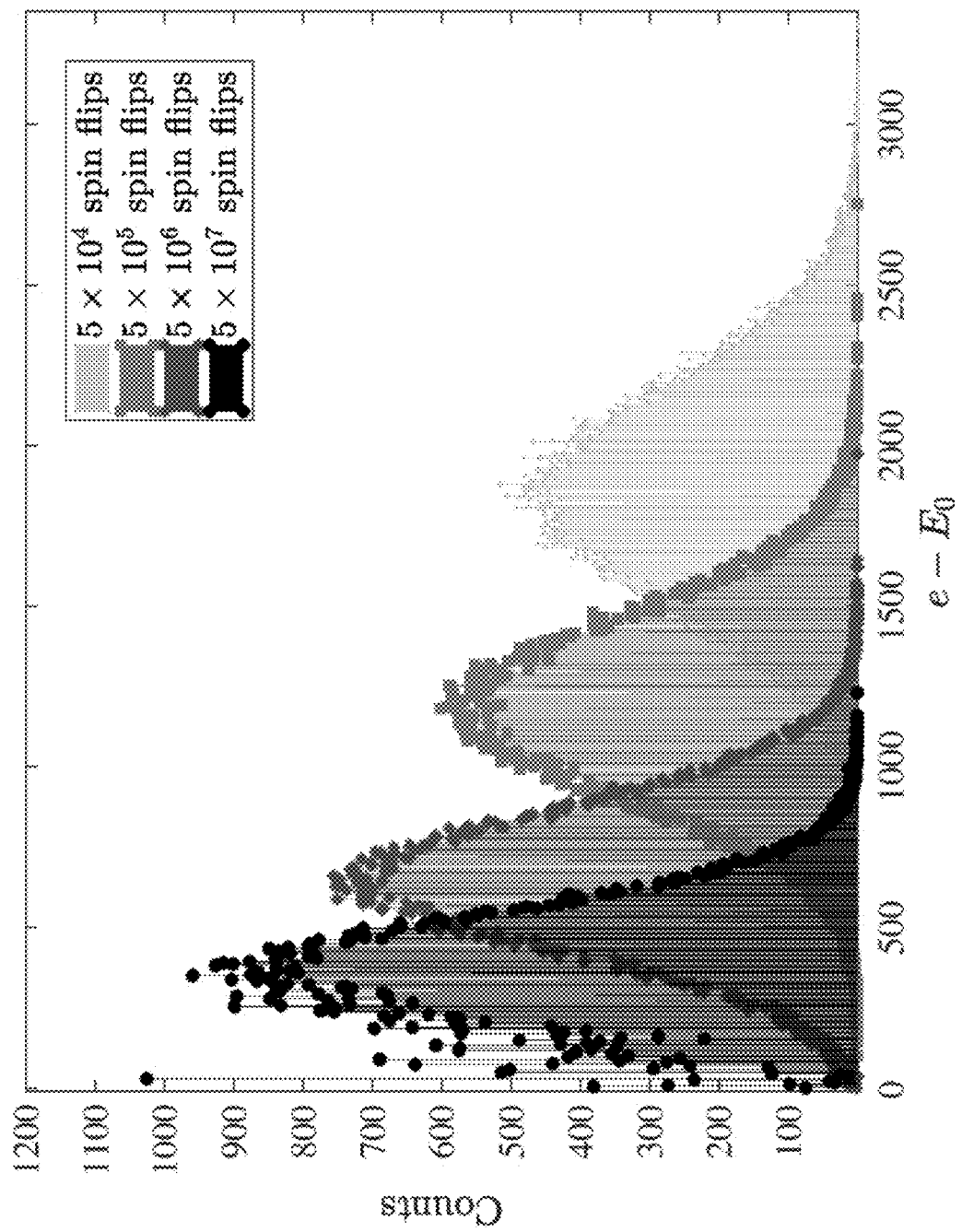
FIGS. 1A and 1B. Empirical quality functions; (energy histograms) obtained running SA $10^5$ times on an instance of the optimization problem with N=1000 variables. As expected, increasing the number of spin updates per run pushes the energy histogram towards lower energy values.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

The algorithms, methods, logic, or strategies disclosed may be deliverable to and/or implemented by a processing device, controller, or computer, which may include any existing programmable electronic control unit or dedicated electronic control unit. Output therefrom may be displayed via interfaces (e.g., display screens), stored to memory, printed to hard-copy, etc. Similarly, the algorithms, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writ cable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The standard approaches described above are simple but also restrictive. As mentioned above, solution quality and computational effort are strictly interdependent quantities: intuitively, setting a more (less) ambitious target quality implies longer (shorter) computation times. Though this is not always the case; e.g., in the case of quantum, adiabatic vs diabatic optimization. In many practical applications one is interested in exploiting this dependence to minimize both quantities at the same time. This may happen, e.g., when there is no reason to choose a specific target or a particular computation length. In other words, we would like to minimize the total cost as a function of the computation time t:

$$C(t)=E(t)+T(t), \quad (1)$$

where E(t) is the quality of the best solution found at time t (without loss of generality we assume that E(t) is the value of the objective function, which we may think of as an energy, that defines the optimization problem) and T(t) is a measure of the computational effort. In practical applications, both E(t) and T(t) could represent, e.g., monetary costs.

The time t* that minimizes the total cost C(t) is the "optimal stopping time", i.e., the time at which we should stop our computation and accept the best solution found. The total cost at the optimal stopping time is the "optimal total cost" $C^* \equiv C(t^*)$. The total cost defined in Eq. (1) expresses a natural tradeoff: an optimization algorithm can in principle achieve the same performance in terms of optimal total cost in a continuum of different ways: by taking more time to generate high quality solutions, or by taking less time to generate lower quality solutions. It is possible, of course, to define the total cost differently in order to express other variants of the tradeoff, but many such variants can be transformed into the form expressed in Eq. (1) [e.g., by taking the logarithm of both sides in the case of total cost being defined instead as the product E(t) and T(t)], and moreover, as we shall see below, Eq. (1) lends itself to an elegant analytical solution for t*.

In the case of randomized optimizers, the minimization problem described above can be formulated in terms of an optimal stopping problem. Sequential statistical analysis provides a general mathematical framework for finding analytical and approximate solutions to optimal stopping problems. In order to keep our analysis as clear and simple as possible, we consider cost functions that are linear in time, i.e., T(t)=ct. This simple but practically relevant choice reduces our problem to the well-known optimal stopping problem known as "house-selling," which has an analytical solution. This will allow us to benchmark and compare optimization algorithms in terms of optimal total cost, rather than just solution quality or computational effort.

Using optimal total cost for benchmarking has several advantages. First, its definition only requires the specification of a cost function T(t), as we have done, and optimal total cost can be easily used to directly compare widely different approaches to optimization. While its implementation is problem and solver independent, the optimal stopping approach naturally specifies a quality target and computational effort that do depend on the specific instance and solver used. In our approach, the choice of the cost function T(t) plays a primary role in benchmarking using optimal total cost. The choice of the cost function is similar to the choice of the quality target when benchmarking via time-to-target measures.

The second advantage of optimal total cost is its flexibility: it can be computed without knowledge of the global minimum. Unbiased benchmarking of optimization algorithms can thus be performed rigorously on arbitrarily hard problems without prior knowledge of their solution, which is the typical situation. Moreover, by choosing different cost functions T(t) one can explore the performance of optimization algorithms in different utilization regimes. Large values of the cost function will result in less ambitious costs and faster computations, and vice versa. This flexibility is fully appreciated when considering that practical situations will essentially determine the value of the cost function, which then informs us about the quality target and computational time that are optimal for that application.

Optimal costs are also useful in determining the optimal amount of hardware resources required for certain computational tasks. This can be simply done by including the costs of using certain hardware into the cost function T(t). Similarly, optimal total cost can help in assessing the practical viability of new technologies whose early adoption usually involve both a relevant improvement in computational performance and a relevant increase of utilization costs. This aspect is particularly delicate for quantum optimization, which promises a computational power (quantum speed-up) not achievable with classical computers. At the same time, the challenges in building a quantum computer will make the first prototypes very expensive. Indeed, commercially available quantum optimizers have been recently built. Remarkably, these prototype devices achieve a level of performance that is already comparable to modern CPUs, despite several decades of continuous technological improvements in classical computation. It is likely that performance of quantum optimizers will increase with time, while their costs will drop. Optimal costs will thus be an important tool to determine the break-even point, i.e., the point where the optimal total cost obtained with quantum hardware will be smaller than that obtained with classical hardware.

This paper is organized as follows. In Section II we formulate the optimal stopping problem mentioned above for randomized optimizers and linear cost functions. We also provide the analytical solution of the problem and discuss the connections between optimal total cost and other standard measures. In Section III we discuss how to experimentally determine optimal total cost. In Section IV we present extensive numerical simulations in which we have benchmarked simulated annealing as a test-case randomized optimization algorithm. We discuss the use of optimal total cost to optimize the number of spin updates for simulated annealing an d discuss the scaling of optimal total cost with problem size. In Section V we compare the optimal total cost obtained with classical and quantum optimization hardware. In Section VI we report on numerical experiments in which we show the feasibility of implementing optimal stopping when the behavior of a randomized solver on a given instance is learned during the computation. In Section VII we discuss how to use optimal total cost in the context of parallel computation. We present our conclusions in Section VIII.

II. BENCHMARKING VIA OPTIMAL STOPPING

As explained above, we propose the optimal total cost as the appropriate measure of performance in the general case where both the solution quality E(t) and the computation cost T(t) play a role. In this section we explain how to find the stopping time t* and optimal total cost C* using the theory of optimal stopping. We then show how the optimal total cost measure can be reduced to standard quality-only measures such as time-to-target or time-to-solution. Using optimal total cost can thus be considered as a general framework for benchmarking that includes known benchmarking strategies as special cases.

A. Optimal Total Cost

We begin by formalizing our definition of optimal total cost in terms of a specific optimal stopping problem. Our fundamental assumption is that we can describe a randomized optimization algorithm in terms of an intrinsic "quality distribution" P(e) of the qualities e of the outcomes. From now on we will mostly use the term "energy" to indicate the quality of a solution, with a smaller energy corresponding to a better quality. Other characterizations, however, may be used. The distribution P(e) will depend on both the solver used and the optimization problem. We also assume that the runtime of the algorithm $t_{run}$ is a constant when the same algorithm is repeatedly run on the same problem with the same parameters. In this scenario, the time dependence in Eq. (1) is discretized in steps of $t_{run}$ and can be rewritten as:

$$C_n = \min\{e_1, \ldots, e_n\} + T_n = E_n + T_n \qquad (2)$$

This equation is interpreted as follows. After the solver is run sequentially n times, we have found the minimum energy $E_n = \min\{e_1, \ldots, e_n\}$ and spent an effort $T_n$ on the computation. At each step, we can either decide to perform more observations, thus trying to lower $E_n$ at the price of increasing the computational effort, or stop and accept the solution corresponding to $E_n$. The optimal strategy for this decision process is to minimize $C_n$ in Eq. (2). In the field of sequential statistical analysis, this decision-making problem is called optimal stopping. Using the principle of optimality, the optimal stopping rule calls for a stop as soon as one finds a solution with energy upper bounded by the optimal total cost C* (henceforth an asterisk always denotes "optimal."):

$$n^* = \min\{n \geq 1 : e_n \leq C^*\} \quad (3)$$

The principle of optimality elegantly encodes the optimal stopping rule into the knowledge of the optimal total cost C*. Because the energies e are i.i.d. random variables, the stopping step n*, and thus all the terms in Eq. (2), can also be considered as random variables when the sequence of measurements is repeated. The optimal total cost is then by definition the average (expected) cost obtained when following the optimal stopping rule:

$$C^* \equiv \langle C_{n^*} \rangle = \langle E_{n^*} \rangle + \langle T_{n^*} \rangle \equiv E^* + T^* \quad (4)$$

where the average is taken over several repeated optimally stopped sequences, and where E* is the optimal energy and T* is the optimal computational effort. Note that the optimal stopping problem defined in Eq. (2) is completely specified by the cost function $T_n$. Using a given solver for a particular application will result in a specific choice of the cost function and will thus specify the optimal stopping problem relevant for benchmarking. Optimal costs are in general very difficult to compute analytically, but a large and sophisticated set of tools has been developed to find approximate stopping rules.

In order to study in detail the use of optimal total cost for benchmarking we consider a special, but practically relevant case that can be solved analytically. We assume that the cost function is linear in time:

$$C_n = \min\{e_1, \ldots, e_n\} + nct_{run} \quad (5)$$

where the parameter c is interpreted as the cost per unit of time that specifies the computational effort. The quantity c has thus units of energy per time, and the computation cost $T_n$ itself has units of energy. The optimal stopping problem defined above is then equivalent to the prototypical optimal stopping problem known as the "house selling problem," which can be solved analytically since it is essentially a Markov model with translational invariance. In this case the optimal total cost C* is the solution of the following optimality equation:

$$C_c^* : \int_{-\infty}^{C_c^*} (C_c^* - e) P(e) de = ct_{run} \quad (6)$$

which is an implicit integral equation for $C_c^*$. Equation (6) involves the knowledge of the probability distribution P(e), which is learned during benchmarking. As one intuitively expects, $C_c^*$ turns out to be a monotonically increasing function of c.

B. Optimal Total Cost as an Energy Target

Note that because the principle of optimality dictates that the sequence of observations in Eq. (5) stops as soon as one finds an energy e below or equal to $C_c^*$, the optimal total cost can be regarded as an energy target.

Pick an energy e at random; the probability that it is at most $C_c^*$ is $p = \int_{-\infty}^{C_c^*} P(e) de$. Since we stop when $e \leq C_c^*$, the probability of stopping after exactly n attempts is $(1-p)^{n-1} p$. The mean stopping step $n_c^*$ is thus $$\sum_{n=1}^{\infty} n(1-p)^{n-1} p = -p \frac{\partial}{\partial p} \sum_{n=0}^{\infty} (1-p)^n = -p \frac{\partial}{\partial p} \frac{1}{p} = \frac{1}{p}, \quad (7)$$

i.e.: $n_c^* = \left[ \int_{-\infty}^{C_c^*} P(e) de \right]^{-1}$

While the optimal stopping problem defined in Eq. (5) is problem and solver independent, the actual value of $C_c^*$ is not. The optimal stopping rule thus provides an energy target that is natural and appropriate for each solver and instance. Note, however, that $C_c^*$ is always larger than the optimal energy $E_c^*$, as long as c>0. This is because necessarily $n \geq 1$ (so that $T_n > 0$) and due to the fact that stopping typically occurs when the last observed energy is strictly smaller than the target: $e_n < C_c^*$. Thus, $C_c^*$ should not be confused with the optimal energy itself.

Using the optimal total cost as an energy target takes into account the occurrences and the values of energies below and above the target. This is an important difference between the total cost and time-to-target measures; the latter are binary in the sense they are only sensitive to whether energies are below or above the target, while the total cost measure is more general. With this in mind, as we show next, the total cost measure can be reduced to a time-to-target measure by an appropriate choice of P(e).

C. Reduction to Time-to-Target

The time-to-target is the total time required by a solver to reach the target energy at least once with a desired probability $p_d$, assuming each run takes a fixed time $t_{run}$. Let p be the $t_{run}$-dependent probability that a single sample will reach the target energy (as estimated by the sample statistic), e.g., some percentage above the minimum energy. The probability of successively failing k times to reach the target is $(1-p)^k$, so the probability of succeeding at least once after k runs is $1-(1-p)^k$, which we set equal to the desired success probability $p_d$; from here one extracts the number of runs k (approximated by a real number) and multiplies by $t_{run}$ to get the time-to-target TtT:

$$TtT = t_{run} \frac{\log(1 - p_d)}{\log(1 - p)} \sim t_{run}/p \quad (8)$$

where the last relation holds for p<<1, and represents the mean time-to-target. With the appropriate choice of P(e), the optimal total cost is easily reduced to TtT. Recalling that the time-to-target deals with a binary assignment (acceptable/unacceptable), we can assume that the energy distribution P(e) takes the following form:

$$P(e) = p\delta(0) + (1-p)\delta(+\infty) \quad (9)$$

where we have assigned a vanishing energy to acceptable solutions and infinitely large energy to unacceptable solutions. For any finite value of $C_c^*$ Eq. (6) then reduces to:

$$C_c^* p = ct_{run} \Rightarrow C_c^*/c = t_{run}/p \quad (10)$$

which shows that the optimal total cost $C_c^*$ is proportional to the computational time $t_{run}/p$ required, on average, to hit the target for the first time, in agreement with TtT for small p.

D. Reduction to Time-to-Solution

The time-to-solution is a special case of the time-to-target, with p now being the probability of the solver finding the minimum energy. The reduction of optimal total cost to time-to-solution thus follows immediately from the previous subsection as the same special case.

It is instructive, however, to see how to extract the time-to-solution directly from the more general setting of Eqs. (5) and (6). In the case of binary optimization, the set of energies that can be observed is always discrete. In the limit c→0 the optimal total cost is smaller than the second-best energy value $E_0 < C_c^* < E_1$. Thus, for sufficiently small c one stops when hitting the optimal solution. We then have from Eq. (5):

$$C_c^* = E_0 + n^* c t_{run} \Rightarrow (C_c^* - E_0)/c = t_{run}/p \quad (11)$$

where $p = 1/n^*$ is the probability to obtain the minimum energy. The difference between the optimal total cost and the minimum energy is thus proportional to the time-to-solution $t_{run}/p$.

E. Reduction to Average Energy

In some cases, one may also be interested in the mean quality as another measure of performance. The mean quality is defined as the expected quality of the solution:

$$\bar{E} = \lim_{n \to \infty} \text{mean}\{e_1, \ldots, e_n\} \quad (12)$$

The optimal total cost can also be reduced to this quantity when the limit c→∞ is taken in Eq. (6), In this limit, in fact, the cost function is so large that it is optimal to stop after taking only one measurement. Assuming that $C_c^* \gg e$, the optimality equation Eq. (6) reduces to:

$$C_c^* = \bar{E} = c t_{run} \Rightarrow \bar{E} = C_c^* - c t_{run} \quad (13)$$

i.e., the mean energy is equal to the difference between the optimal total cost and the computational effort for running the solver once, in the limit of large c.

F. Redaction to Target-in-Time

The reduction of the optimal total cost to a target-in-time measure can be achieved by choosing an appropriate cost function $T_n$ as follows:

$$T_n = \begin{cases} 0 & n t_{run} < T \\ +\infty & n t_{run} > T \end{cases} \quad (14)$$

The optimal stopping rule is thus trivially to stop at $n^* = |T/t_{run}|$, and there is no advantage to stopping the computation earlier. The optimal total cost is then the average best energy found in a time T, i.e., a target-in-time measure.

III. EXPERIMENTAL DETERMINATION OF OPTIMAL TOTAL COST

The energy distribution P(e) needs to be determined to compute the optimal total cost $C_c^*$ via the optimality equation (6). Because the integral function appearing in the optimality equation is monotonia, Eq. (6) can easily be solved using numerical methods. An empirical estimate of the energy distribution P(e) can be obtained by sampling a sufficiently large number of energies. The empirical energy distribution is always discrete, and can be written as a sum of Dirac deltas centered at the values of the observed energies: $P(e) = \Sigma_i p_i \delta(e - e_i)$. The weights $p_i = n_i/N$ are the observed frequencies.

Experimental estimates are always performed on finite samples and statistical errors propagate non-trivially from the energy distribution to the calculation of the optimal total cost $C_c^*$. This is due to the fact that rare or unobserved solutions may significantly contribute to the value of $C_c^*$. In fact, the computation of $C_c^*$ involves an integration over the lower tail of P(e), which is typically under-sampled in the case of hard problems. The statistical uncertainty $\delta P(e)$ in the determination of the lower tail of the energy function corresponds to an error $\delta C_c^*$ for the optimal total cost that can be estimated as follows:

$$\delta C_c^* = \frac{\int_{tail} e \delta P(e) de}{\int_{-\infty}^{C_c^*} p(e) de} \quad (15)$$

This expression shows that there are three main factors that contribute to the error in the estimate of $\delta C_c^*$. The first is, as usual, the sample size. A larger number of observations reduces the weight of the unobserved tail and lowers the value of the numerator. Another factor is the shape of the tail. The numerator can be large for heavy-tailed distribution even if the tail contains only very rare events. The third factor comes from the denominator and simply depends on the value of $C_c^*$. The denominator is smaller for smaller values of the optimal total cost, and thus the overall error is larger. This can be intuitively explained by the fact that smaller values of $C_c^*$ are more sensitive to the lower tail of the energy distribution.

In this work we assume that the energy distribution is not heavy-tailed. This is confirmed by all the numerical experiments we have performed, and ensures that the error in the determination of the optimal total cost is negligible when $C_c^*$ is larger than a purposely chosen percentile of P. (Heavy tails are known to be an issue with simulated quantum annealing, not used in our work.) The possibility of reliably computing $C_c^*$ without good knowledge of the lower tail of the energy functions means that we can perform benchmarking without knowledge of the optimal solution. The advantage of this is that the time used for benchmarking is chosen by the experimenter, not imposed by the hardness of the problem. Benchmarking an optimization algorithm via optimal total cost on a set of arbitrarily hard instances will take more (or less) time depending on whether the experimenter needs to determine $C_c^*$ for smaller (or larger) values of c with sufficient accuracy.

To illustrate the use of optimal total cost in a benchmarking study, we use simulated annealing (SA) to study the following optimization problem defined on N=1000 binary variables:

$$H = \Sigma_{i<j}^N J_{ij} s_i s_j, \ s_i = \pm 1 \quad (16)$$

where the $J_{ij}$ are integers randomly chosen uniformly from the set $\pm\{1, 2, \ldots, 10\}$, This problem is equivalent to a weighted MAX2SAT with a number of clauses equal to the number of total variable pairs. It is also equivalent to finding the ground state of an Ising model defined on a complete graph $K_{1000}$. For all our numerical experiments we used an_ss_ge_fi_vdeg solver. This optimized simulated annealing code achieves one spin update every about 10 nanoseconds on modern CPUs (single core performance). All our simulations were performed using a linear temperature schedule, with $T_{init}=10$ and $T_{fin}=\frac{1}{3}$. It is well known that the temperature schedule and the initial and final temperatures play a crucial role in determining the performance of SA, but here we chose to focus only on the number of spin updates as the central optimization parameter. To keep our discussion independent of the particular CPU used, we assume that the run-time $t_{run}$ is proportional to the number of spin updates $n_{sf}$ performed during an SA run. We thus have $T_n=ncn_{sf}$ for the computational cost function, with the constant c now specifying the cost per spin update. The actual value of c is, in practice, CPU-dependent.

Figure 1B:
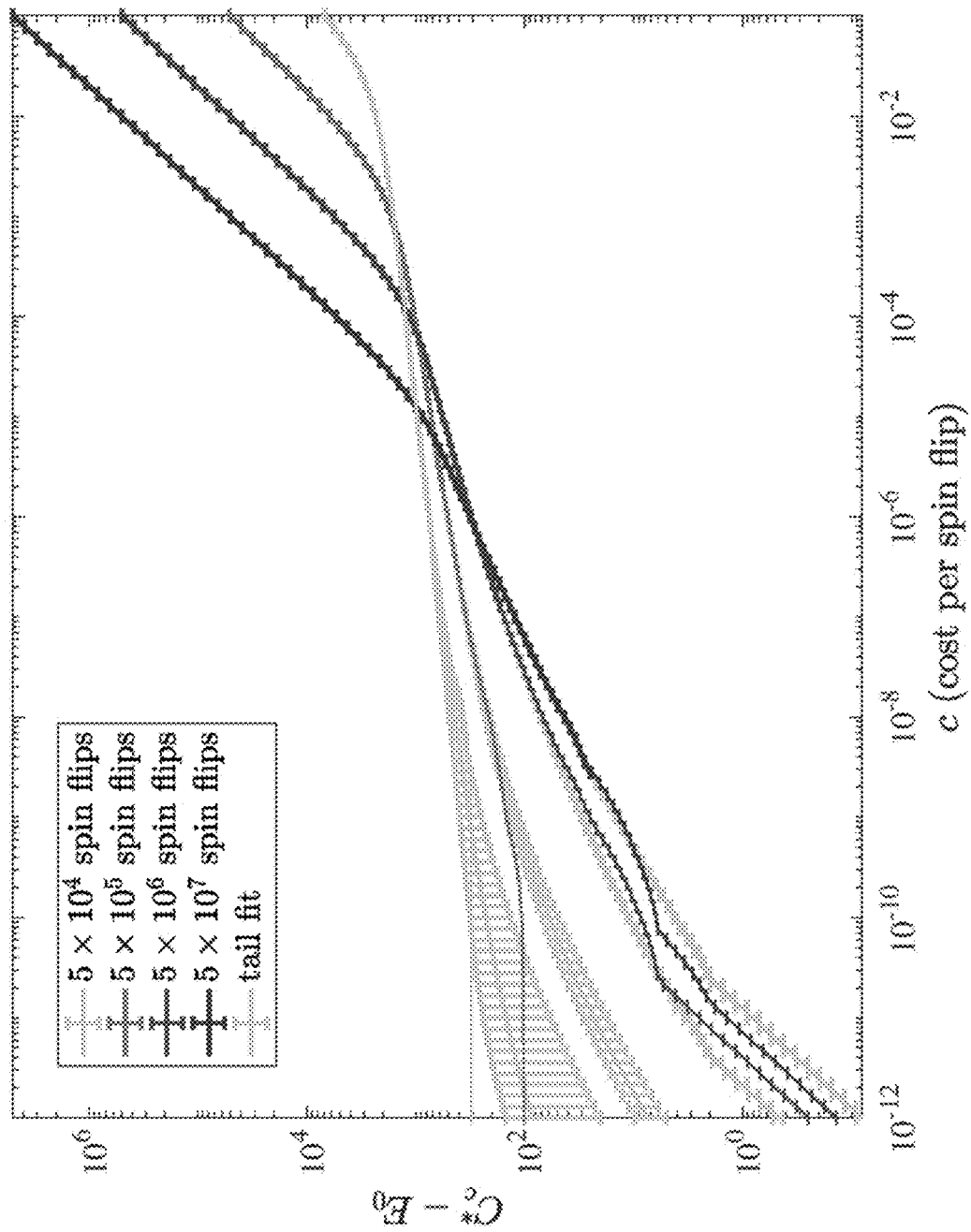

FIG. 1A shows the quality distribution P(e), or energy histogram, when $10^5$ samples are generated by running SA simulations with four different numbers of total spin updates, for a single randomly selected problem instance corresponding to Eq. (16). The number of samples collected was not sufficient to find the global optimal with only $5\times10^4$ or $5\times10^5$ updates. As expected, a larger number of spin updates pushes the distribution towards smaller energies. FIG. 1B shows the optimal total cost $C_c^*$ corresponding to the energy distributions of FIG. 1A. The optimal total cost is, as expected, a monotonic function of the cost per spin update c. The optimal total cost is minimized by using a smaller (or larger) number of spin updates when c is larger (or smaller). There is a simple intuitive explanation for this: expensive computations (large c) favor fast computations (small number of spin updates), while on the other hand cheap computations (small c) favor long computations (large number of spin updates). At intermediate values of c, the SA algorithm gives the same performance (when two curves meet) using two different numbers of updates per run. This happens when the improvement in the average solution quality obtained by implementing a larger number of updates is exactly offset by the increase in the observational cost.

The lower envelope is the optimal compromise between cost and efficacy of a single SA run, which is determined by the number of spin updates per run, $n_{sf}$. Namely, for any given cost one can infer the optimal value of $n_{sf}$ by selecting the lowest of the curves at that value of c. This is a non-trivial conclusion obtained from our optimal stopping approach that cannot be obtained within the traditional benchmarking framework that focuses entirely on minimizing the energy or the time to an energy target.

The thin lines in FIG. 1B are the optimal total cost computed by substituting the experimental energy distributions into the optimality equation. The bold lines are the mean and the standard errors of a sample of 1000 values of $C_c^*$ obtained as follows. We first generated 1000 bootstrapped copies of each of the quality distributions of FIG. 1A. We modeled the lower tail (the first 0.1 th percentile) of each bootstrapped distribution with a maximum likelihood fit of a Generalized Pareto Distribution. All the $C_c^*$ values were then computed using the bootstrapped distribution with the tail replaced by the Pareto fit. The bold lines correspond to the values of the optimal total cost that fall into the fitted tail, while the other bold lines are the values of $C_c^*$ that are outside the tail. Note that the error bars are relevant only when the optimal total cost falls inside the tail. We thus see that even an imprecise knowledge of the tail of the distribution does not affect the precise evaluation of $C_c^*$ for sufficiently large values of the cost c, in agreement with Eq. (15).

We now illustrate how the average solution quality and computational effort contribute to the optimal total cost as a function of the cost c. To do so we write Eq. (4) for our special case $T_n=ncn_{sf}$:

$$C_c^* = E_c^* + n_c^* cn_{sf} \qquad (17)$$

Figure 2A:
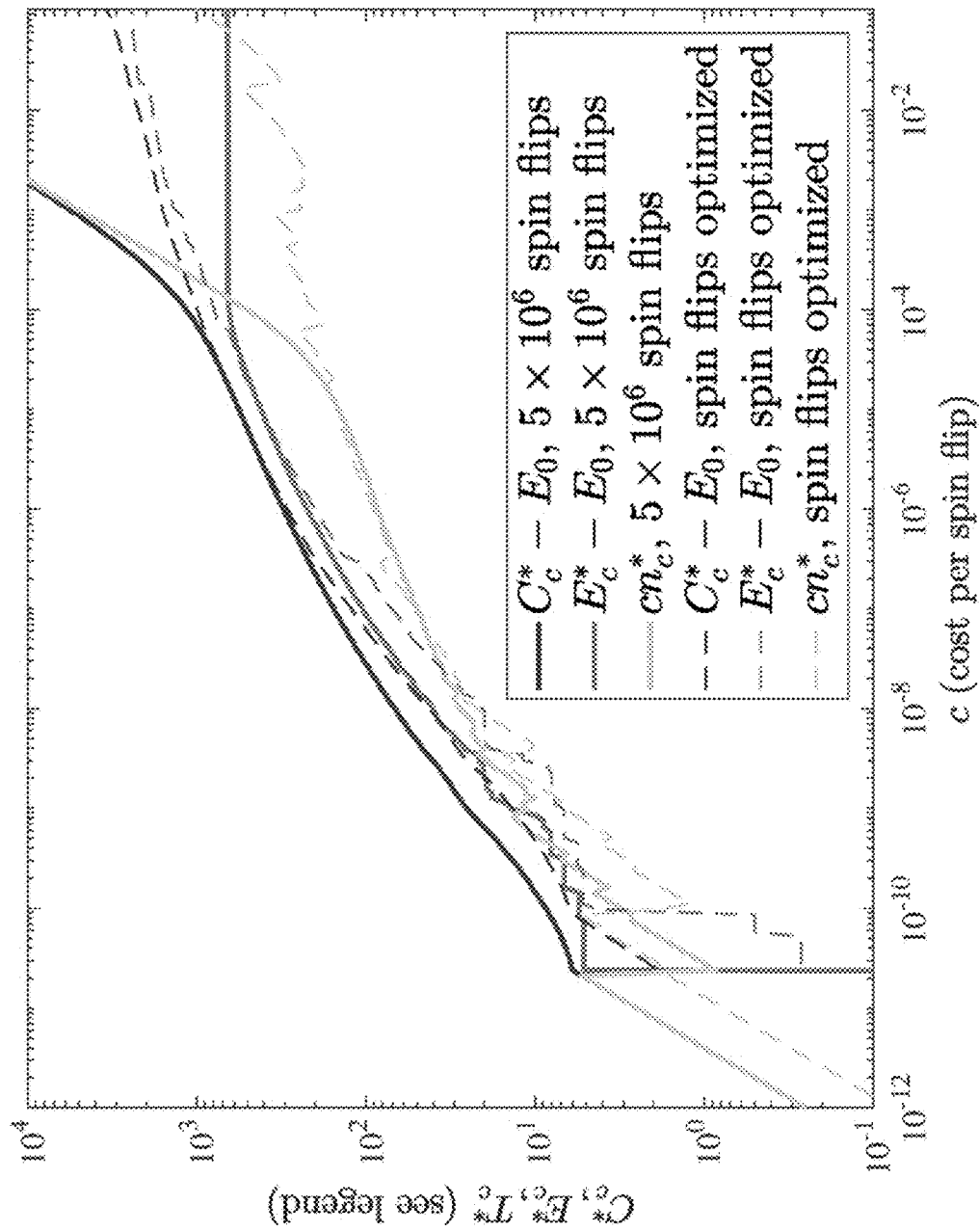
FIG. 2A. Optimal cost $C_c^*$, optimal energy $E_c^*$, and optimal computational cost $T_c^*$ computed by running SA with a fixed (solid lines) and optimized (dashed lines) number of spin updates (corresponding to the lower envelope of $C_c^*$ as described in FIGS. 1A and B, FIG. 2B. Tradeoff between optimal stopping time $n_c^* n_{sf}$ (with optimized $n_{sf}$) and solution quality $E_c^*$. The gray-scale gradient code shows a monotonic inverse dependence of the stopping time on the unit cost c. Overlapping dots corresponding to very small c toward the top effectively have $E_c^*=E_0$; their common value on the vertical axis is the optimal time-to-solution. Data shown here corresponds to the same representative instance as in FIGS. 1A and 1B.

We then use Eq. (7) to compute the average stopping step $n_c^*$ as a function of the energy distribution. FIG. 2A shows the values of the functions $C_c^*$, $E_c^*$ and $T_c^*$ and for the same representative instance as in FIGS. 1A and 1B. Solid lines give the three functions computed for the case with $5\times10^6$ spin updates, while dashed lines correspond to the case with the number of spin flip updates $n_{sf}$ optimized to minimize the optimal total cost $C_c^*$, i.e., with $n_{sf}$ chosen as a function of c according to the lower envelope in FIG. 1B. Note that there are two distinct notions of optimality at play at this point: optimal stopping, as dictated by the principle of optimality (indicated by an asterisk superscript), and optimality of the number of spin updates, which is SA-specific and is found from the lower envelope of FIG. 1B. Other solvers, such as the D-Wave quantum annealer discussed below, are subject to an analogous "optimal annealing time" notion. Also note that because the energy spectrum is discrete, $E\_c\hat{}^*$ and $T\_c\hat{}^*$ are not continuous functions of c, while the total cost $C\_c\hat{}^*$ is continuous.

For the case with a fixed number of updates, we can identify three distinct regimes in FIG. 2A: (i) In the small c regime with $E_0 < C_c^* < E_1$ (optimal solution region) we have:

$$C_c^* = E_0 + n_0 cn_{sf} \qquad (18)$$

where $n_0$ is the average number of samples needed to find the optimal solution. In this regime the optimal energy is equal to the minimum energy $E_c^* = E_0$, and the computation effort and the optimal total cost grow linearly with c. The value of the optimal total cost in this regime is thus completely determined by the success probability $p_0$ of the solver in finding the optimal solution, i.e., $n_0 = 1/p_0$, and is determined (apart from the constant $E_0$) by the computational cost $T_c^*$; (ii) In the intermediate c regime the optimal total cost is given by a balance between solution quality and computational cost:

$$C_c^* = E_c^* + n_{C_c^*} cn_{sf} \qquad (19)$$

where $n_{C_c^*}$ is the average number of samples needed to find a solution with quality at least equal to the optimal total cost. The optimal total cost in this regime depends non-trivially on the full energy distribution of the solver. FIG. 2A shows that in this regime the value of the optimal total cost is dominated by the value of the optimal energy $E_c^*$. Moreover, from FIG. 2A we see that in this region $C_c^*$ appears to have a subpolynomial dependence on c;
(iii) In the large c regime the computational effort is so high that it is optimal to draw only one sample:

$$C_c^* = \bar{E} + cn_{sf} \qquad (20)$$

where $\bar{E}$ is the mean energy obtained by running SA with a fixed number of spin updates ($5\times10^6$). In this regime $C_c^*$ is dominated by the computational cost $T_c^*$ and is again a linear function of c.

When the number of SA updates is optimized (dashed curves in FIG. 1A), we only distinguish two regions. The optimal number of spin updates decreases for larger c to prevent the cost function $T_c^*$ from dominating the value of the optimal total cost. The third region thus disappears in favor of an extended intermediate region. Note that in this region minimizing the optimal total cost is not equivalent to optimizing the energy or the computational effort.

Figure 2B:
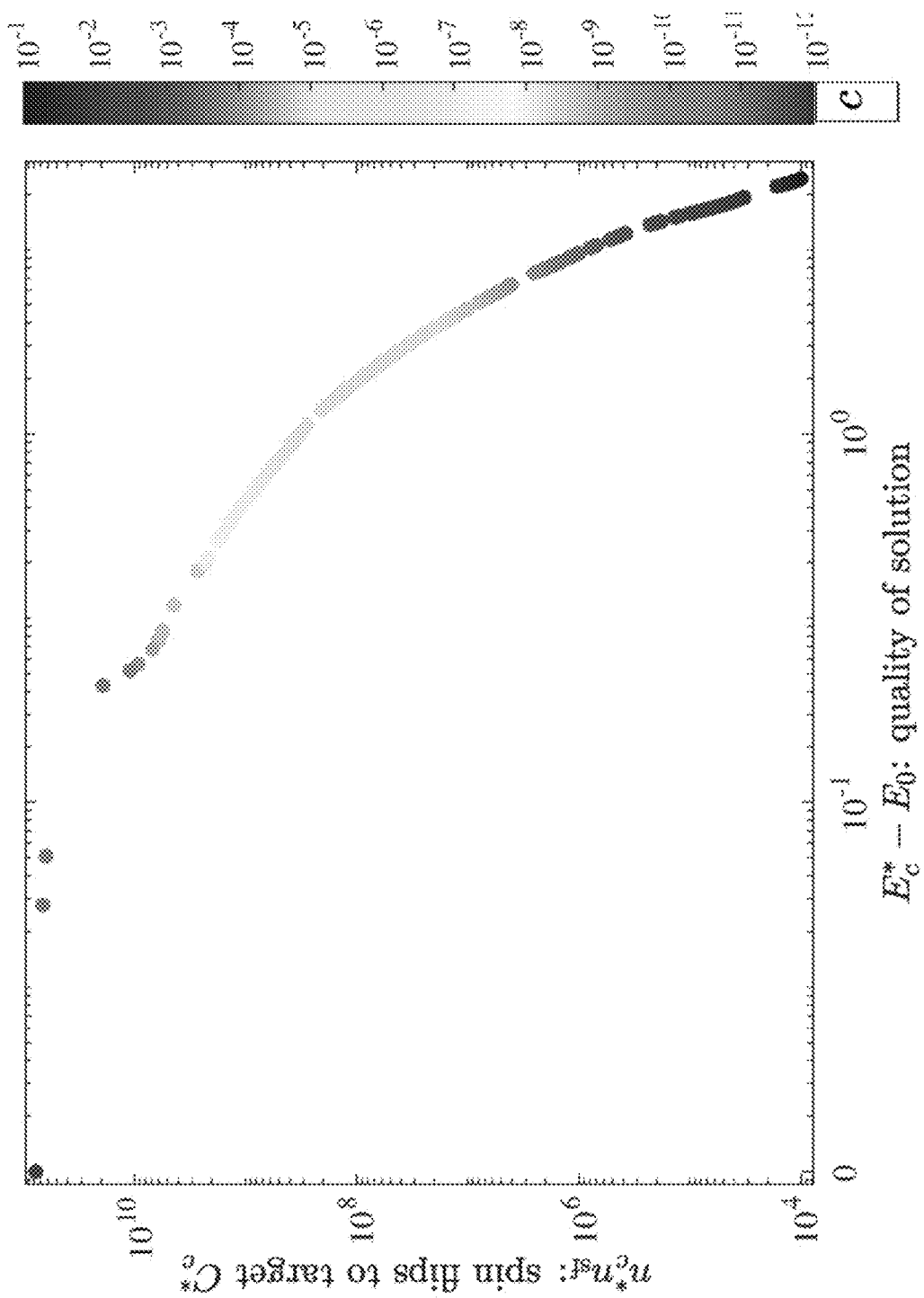

It is also interesting to study the relation between the optimal stopping time $n_c^* n_{sf}$ and the optimal energy $E_c^*$. FIG. 2B shows the tradeoff between the two quantities when the number of spin updates $n_{sf}$ has been optimized. A lower (better) energy solution requires, as intuitively expected, a longer stopping time. The gray-scale gradient code in FIG. 2B represents the value of the unit cost c, which is inversely related to the stopping time.

IV. BENCHMARKING AND SCALING VIA OPTIMAL TOTAL COST

In this section we study scaling with problem size. Toward this end we generated 100 Ising instances defined on complete graphs of sizes N=250; 500; 750 and 1000. As in the example discussed above, each instance was randomly generated with integer coupling $J_{ij}$ randomly chosen uniformly from the set $\pm\{1, 2, \ldots, 10\}$. The number of spin updates of the SA solver was optimized as before to minimize the optimal total cost $C_c^*$. For this optimization we considered 21 different values for the number of spin updates $n_{sf}=N\times\{(1,3,5,7)\otimes(1,10,100,1000,10000), 100000\}$, for each N value. For each instance and number of spin updates, we performed $10^5$ SA runs. An instance-by-instance estimation of the statistical error of $C_c^*$ could be performed as explained in the previous section. However, since we are interested in sample-wide properties, we computed the optimal total cost as if our experimental determination of P is exact. This approach is appropriate if the sample variability is larger than the single-instance errors in determining the optimal total cost (we checked that this is indeed the case).

Figure 3A:
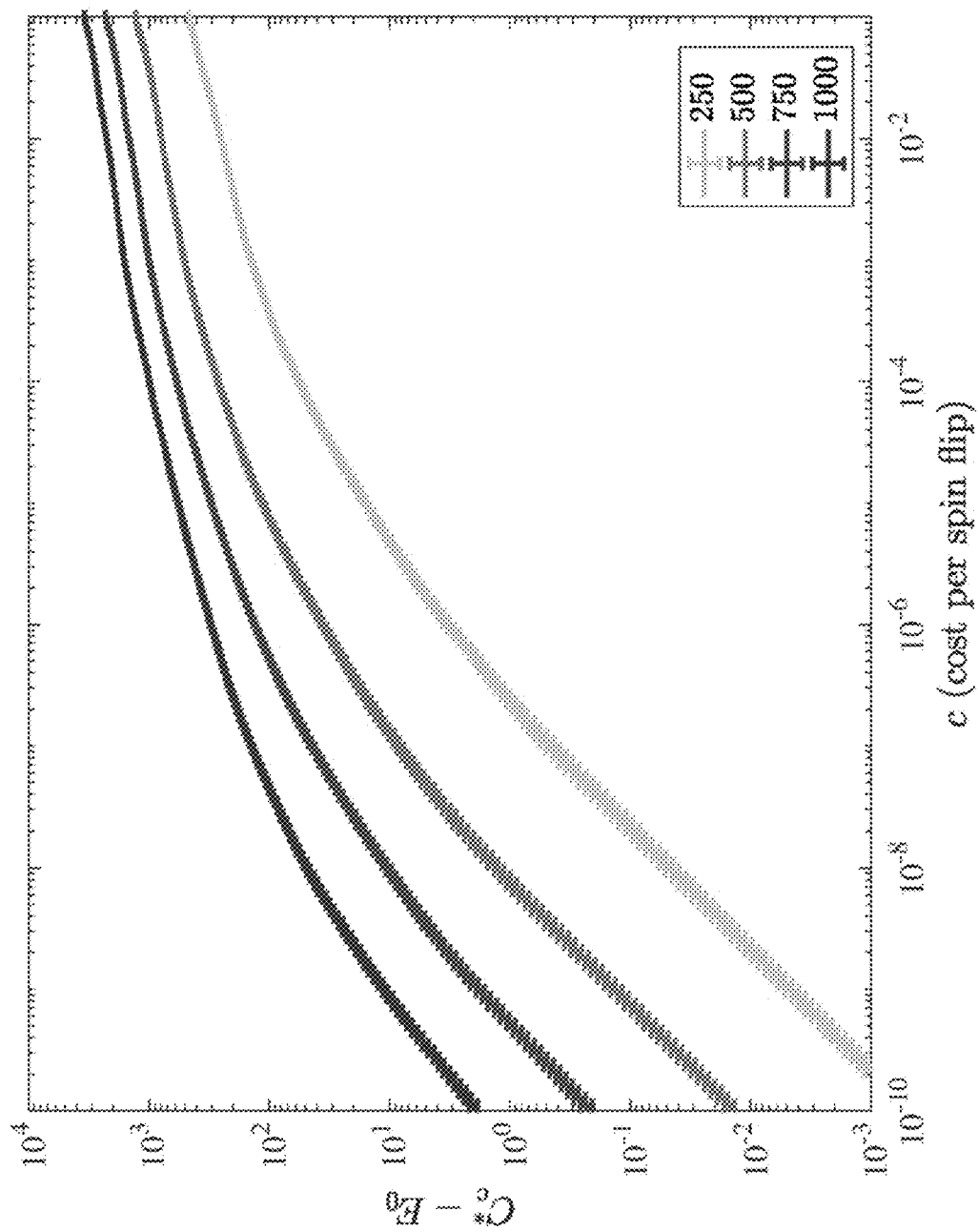
FIG. 3A. Optimal total cost $C_c^*$ for the four different problem sizes considered. Each point in the plot is the mean optimal total cost of the sample of 100 instances. Error bars (small in the figure) are the standard deviation of the mean optimal total cost.

The results are summarized in FIGS. 3A-3D. In FIG. 3A we show the optimized value of Q as a function of c for the four sample sizes of random instances. We again identify two regimes: $C_c^*<E_1$ (optimal stopping after finding the minimum energy) and $C_c^*<E_1$ (optimal stopping before finding the minimum energy). As expected, the transition between the two regimes happens at smaller values of the unit cost c for harder problems defined on a larger number of variables N. That is, for fixed cost c, the larger is N the sooner it is optimal to stop before finding the minimum energy. The difference $C_c^*-E_0$ also grows with the problem size at a fixed c: harder problems imply a larger distance of the stopping target $C_c^*$ from the minimum energy.

Figure 3B:
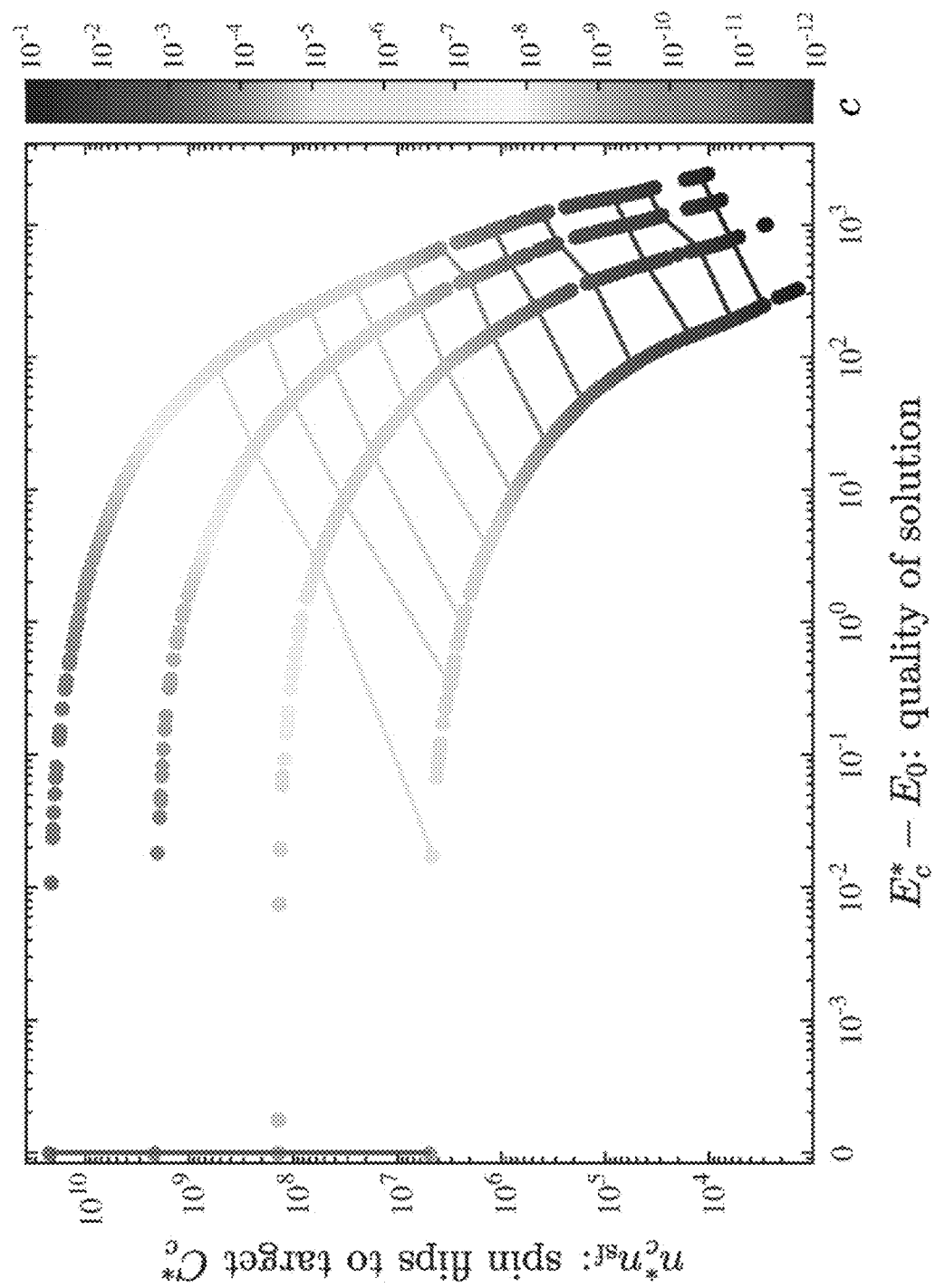
FIG. 3B. Tradeoff between mean stopping time $n_c^* n_{sf}$ and solution quality $E_c^*$ averaged over the 100-instance sample. The gray-scale code gives the c value. The streaks are guides to the eye connecting dots with the same darkness (same value of c). The four curves are ordered by problem size with N=1000 at the top.

FIG. 3B shows the mean number of updates to stopping as a function of the expected solution quality $E_c^*$, for the four different problem sizes (N=250 is the bottom curve). If c is sufficiently small (vertical line), one always has $E_c^*=E_0$, and the optimal stopping time (in this case the time-to-solution) grows with the problem size. For larger c, however, to minimize $C_c^*$ it is optimal to both increase the computation time and reduce the expected quality solution $E_c^*$. This nontrivial dependence of $T_c^*$ and $E_c^*$ on the problem size (at fixed c; see the streaks in the figure) entails a very different scaling analysis than other typical approaches that keep a fixed target (or fix the target as a percentage of the optimal solution).

Figure 3C:
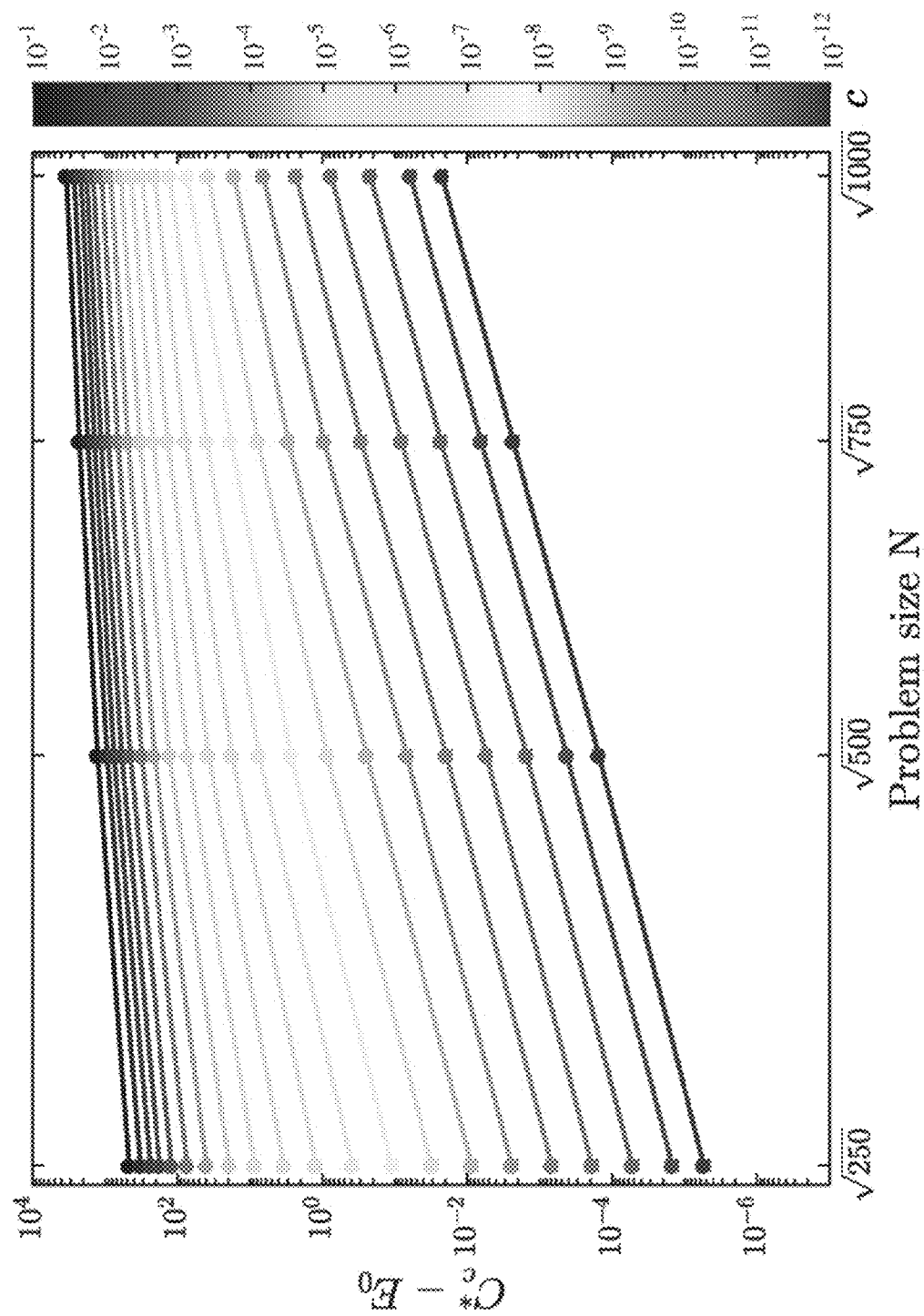
FIG. 3C. Scaling of the optimal total cost $C_c^*$ relative to the global optimum $E_0$. At fixed problem size the optimal total cost $C_c^*$ grows relative to $E_0$ as a function, of the cost c. This is a necessary price to pay to keep the computational cost at the optimal level.
Figure 3D:
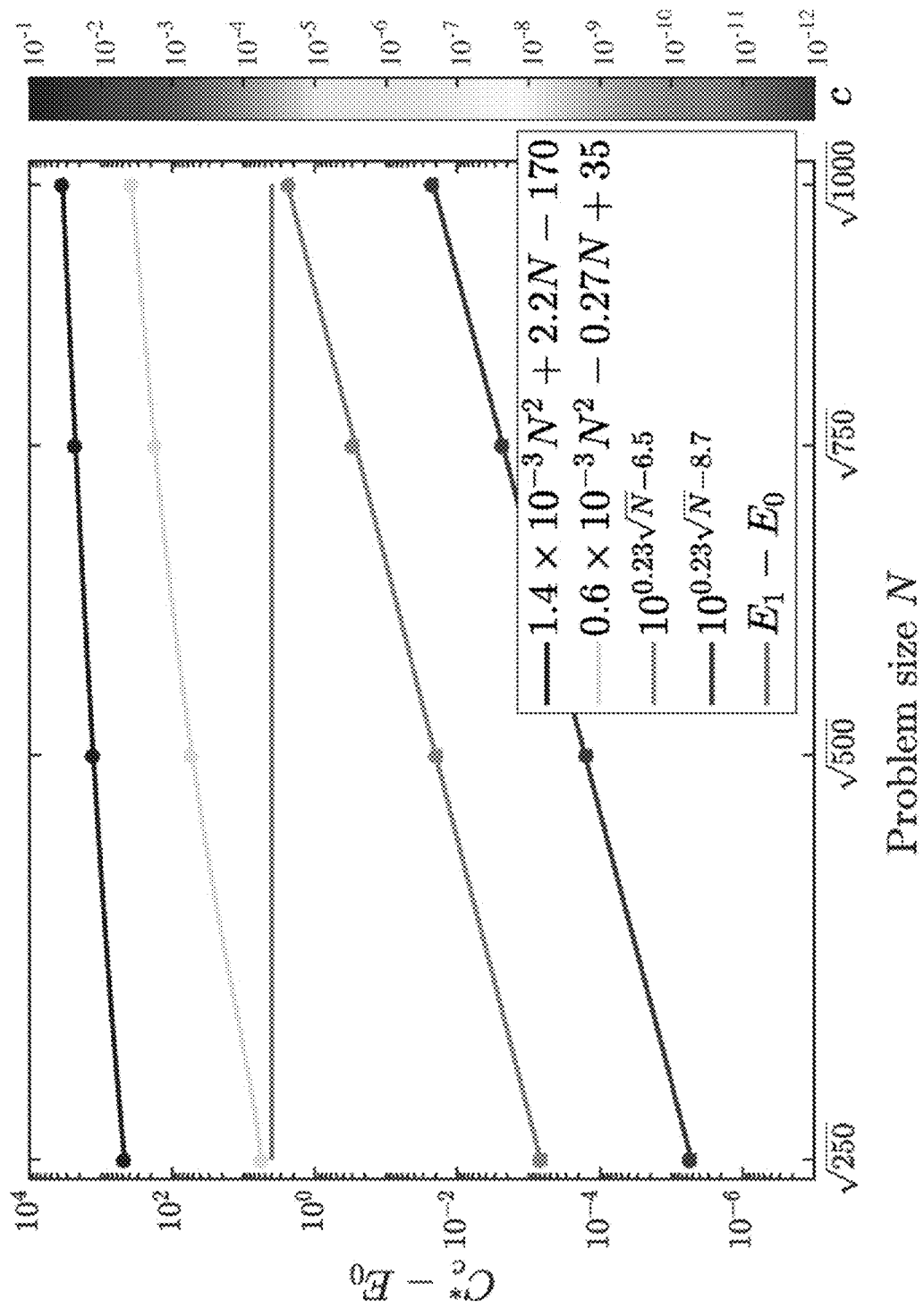
FIG. 3D. The horizontal line is $C_c^*=E_1$. Regression fits reveal a region of quadratic scaling (above the Line) and a region of exponential scaling (below the line). Fit parameters are given in the legend.

The resulting scaling of the optimal total cost is shown in FIG. 3C. Note that for convenience in plotting the FIGS. we always remove an overall constant (the energy of the global minimum $E_0$) from $C_c^*$. Such a constant is indeed irrelevant for benchmarking the performance of SA. While this is not obvious from FIG. 3C, the scaling behavior of $C_c^*$ depends crucially on which of the two regimes of FIG. 3A we are probing. This is shown in more detail in FIG. 3D, where the two regimes are separated by a horizontal line ($C_c^*=E_1$). Below the horizontal line $C_c^*$ depends linearly on c, but at fixed c, it scales exponentially with the problem size. This corresponds to the exponential scaling of the time-to-solution. Above the horizontal line, the scaling of $C_c^*$ is quadratic in the problem size. Note that, at fixed c, $C_c^*$ crosses the horizontal line exponentially fast. This "give-up" size corresponds to the point where it is no longer optimal to stop after finding the global solution. The optimal total cost will thus always have an initial exponential scaling followed by a quadratic scaling after a characteristic give-up size. The quadratic scaling for sufficiently large sizes can be explained by the fact that, for our choice of problems, the typical energy differences grow quadratically: $E_{2^N}-E_0 \sim N^2$. The scaling behavior of the optimal total cost can be summarized as follows:

$$C_c^*(N) \sim \begin{cases} ae^{\beta\sqrt[4]{N}} & C_c^* > E_1 \\ \gamma N^2 + \delta N + \omega & C_c^* > E_1 \end{cases} \quad (21)$$

Using the relations above, the give-up size $N_{gu}$ at which scaling behavior changes can be estimated by:

$$ae^{\beta\sqrt[4]{N_{gu}}} \simeq E_1 \Rightarrow N_{gu} \simeq \log^2(E_1/a)/\beta^2 \quad (22)$$

which means that the give-up size $N_{gu}$ decreases polynomially (quadratically in our case) with the exponential prefactor $\beta$ and decreases logarithmically with the prefactor $\alpha$. Thus, even obtaining a solver with a reduced exponential prefactor (the realistic goal for solvers tackling NP-hard problems, as opposed to an exponential speedup) would result in a modest polynomial increase in the give-up size $N_{gu}$. Quite remarkably, and importantly from a practical point of view, this means that the polynomial scaling regime is the relevant scaling regime for optimal total cost in scenarios with very hard optimization problems.

Figure 4A:
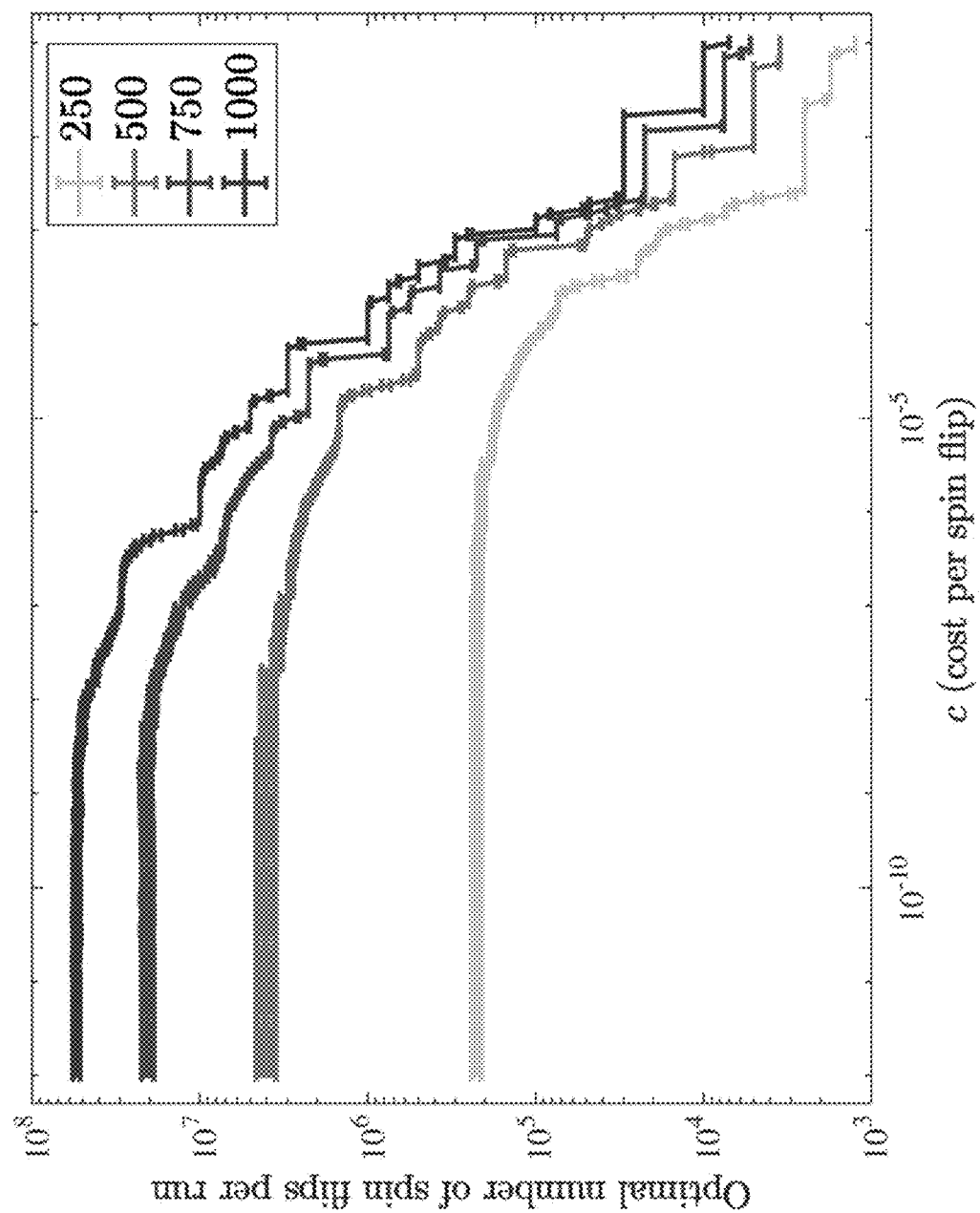
FIG. 4A. Optimal number of spin updates $n_{sf}$ per SA run, as a function of the unit cost (per spin update) c. As expected, this number grows with both decreasing c and increasing problem size N. The figure suggests a sub-polynomial scaling with c.
Figure 4B:
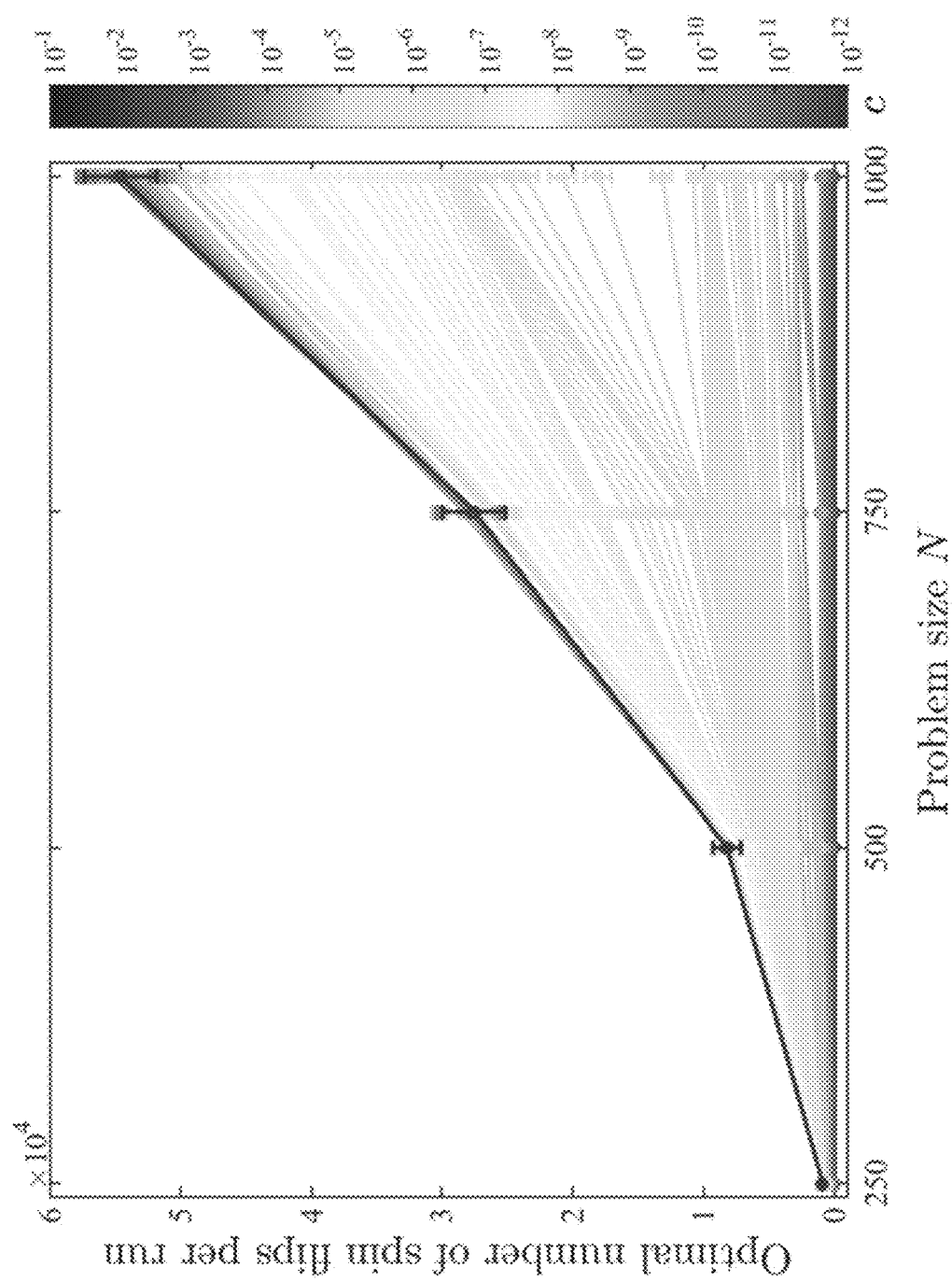
FIG. 4B. Optimal number of spin updates $n_{sf}$ per SA run, as a function of the problem size N. While this number is expected to grow when the computational cost is negligible (small c), it is seen to saturate for intermediate and Large values of c.

We conclude this section by analyzing how the optimal number of spin updates depends on c and how it scales with problem size. The optimal number of spin updates, shown in FIG. 4A as a function of c, is constant in the regime of small c and monotonically decreasing in the large c regime. The two regimes correspond again to the two described in FIG. 3A. Similarly, FIG. 4B shows the scaling of the optimal number of spin updates as a function of problem size. Although it is difficult to extract the scaling with problem size from the data presented, it is clear from FIG. 4B that the optimal number of spin updates grows more rapidly for smaller c. Interestingly, our results indicate that at larger values of c the optimal number of spin updates stays almost constant. This very mild scaling is necessary to keep the computational cost under control when the problem size is increased.

To summarize, in this section we have shown how the optimal stopping approach leads to a non-trivial scaling of the optimal total cost $C_c^*$ and how this scaling is balanced between the optimal solution quality $E_c^*$ and optimal computational cost $T_c^*$. The only assumption we made is that it is possible to assign a meaningful cost per unit of time c, which we assume to be constant in the scaling analysis.

V. CLASSICAL VS QUANTUM OPTIMIZATION

In this section we use optimal total cost to compare the performance of a D-Wave quantum annealer to two classical optimization algorithms: SA and the Hamze-Freitas-Selby (HFS) algorithm. Here we used the an_ms_r3_nf solver, which is a highly optimized code for instances with J_ij∈±{1,2,3} defined on bipartite graphs with low connectivity (like the Chimera graph). This code is able to achieve up to one spin update per nanosecond on modern CPUs (single thread performance).

Our instances were generated with a value of the clause density α equal to 0.35.

Quantum annealers are analog quantum devices that exploit the physical process of quantum annealing to solve hard quadratic unconstrained optimization problems. The optimization problems that can be implemented on a DW2X processor are similar to those considered in the previous sections (see Eq. 16):

$$H = \Sigma_{(i,j) \in chimera} J_{ij} S_i S_j, \; S_i \pm 1 \quad (23)$$

with the important restriction that the sum now runs over the couplings that are physically implemented in a Chimera connectivity graph, defined on 12×12 unit cells of 8 qubits each. The HFS algorithm is optimized to take advantage of the specific low-tree-width structure of the Chimera graph, while SA is not.

To benchmark the three solvers, we considered sub-lattices of the Chimera graph defined on L×L unit cells, with L=4, 6, 8, 10, 12 and 100 instances per lattice size. Hard instances with $J_{ij} \in \pm\{1,2,3\}$ were generated by planting a known solution according to known techniques. Our instances were generated with a value of the clause density α equal to 0.35.

The DW2X processor has a tunable annealing time which we set to the smallest available value $t_{DW}$=5 μs, which appeared to be optimal (in the given range of annealing times; a shorter annealing time is likely to have improved performance) for all values of c. The cost of drawing a sample with the DW device is thus $ct_{DW}$. The run-time of an SA algorithm can be considered to be proportional to the number of spin updates performed each run. We thus assume $t_{SA} = n_{sf} \times 1$ ns 1 ns and the cost to draw an SA sample is $ct_{SA}$. The number of spin updates $n_{sf}$ is always assumed to be optimized to minimize the optimal total cost. The HFS algorithm is more complex, but it also performs a number of elementary operations $n_{eo}$ per run which can be optimized by the user. On modern CPUs we typically have $t_{HFS} = n_{eo} \times 0.6$ μs and the cost to draw an HFS sample is $ct_{HFS}$. The values chosen for $t_{sa}$ and $t_{HFS}$ are representative and can change depending on the experimental setup.

Figure 5A:
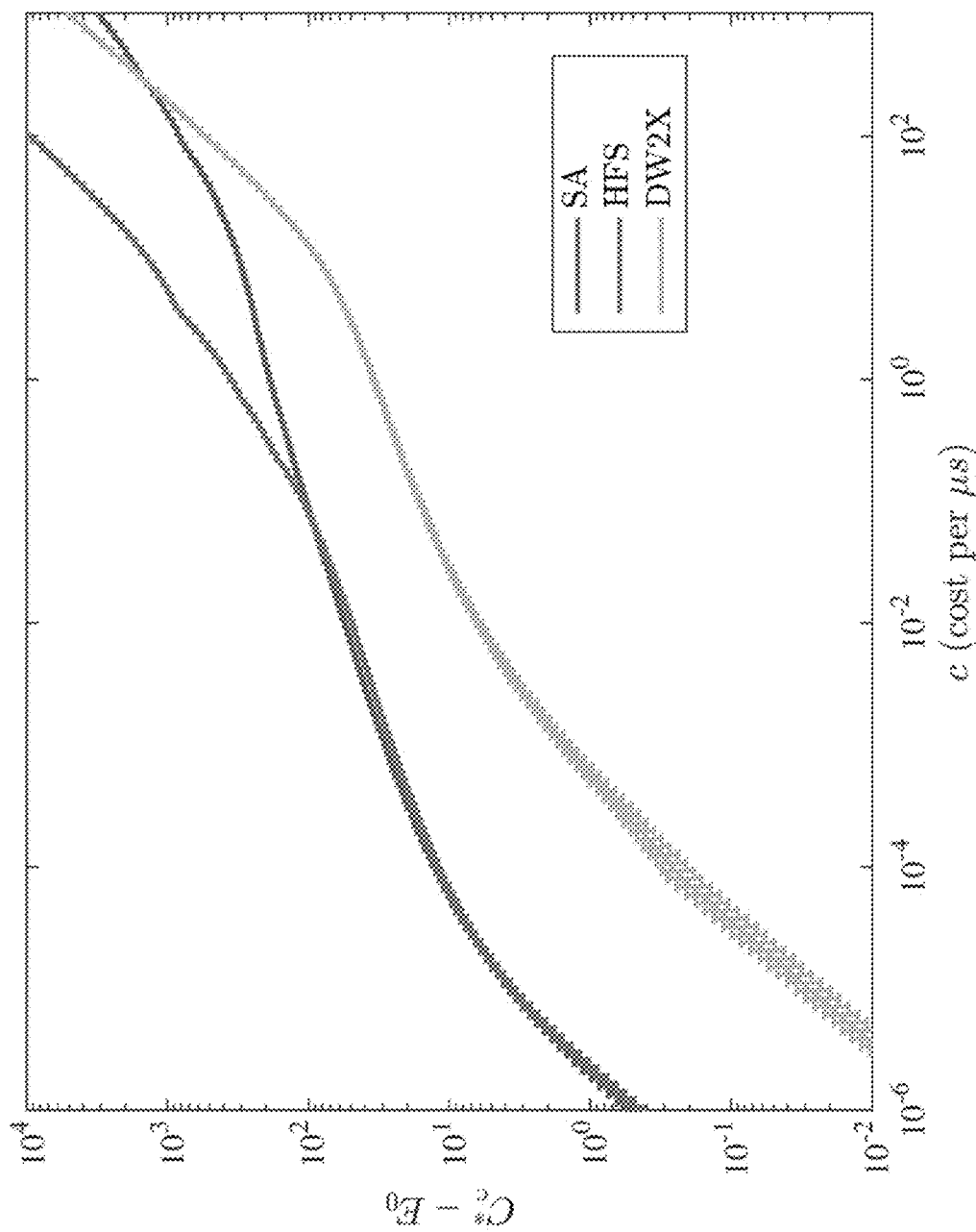
FIG. 5A, Optimal cost for SA, HFS, and DW2X, averaged over 100 instances with planted solutions defined on the full Chimera graph.

In FIG. 5A we compare the averaged optimal total cost $C_c^*$ obtained by the three solvers on the set of 100 instances defined on the full DW2X hardware graph (L=12). In this section we assume for simplicity that the unit cost c is the same for all solvers (e.g., we do not account for the differences in the utilization costs of the three solvers). We discuss the practical necessity to include such costs at the end of this section. With this in mind, we see that the three solvers perform differently for different values of c. For example, HFS appears to perform slightly better than SA for small values of c, while SA performs much better than HFS for larger values of the cost parameter. The DW2X quantum optimizer, on the other hand, significantly outperforms the classical solvers for most of the c values considered. Only at very large c, SA seems to have an advantage. It is important to note that FIG. 5A compares the performance of a DW2X processor with the performance of the SA and HFS algorithms run on a single core of a modern CPU; we address parallelization in Section VII.

Figure 5B:
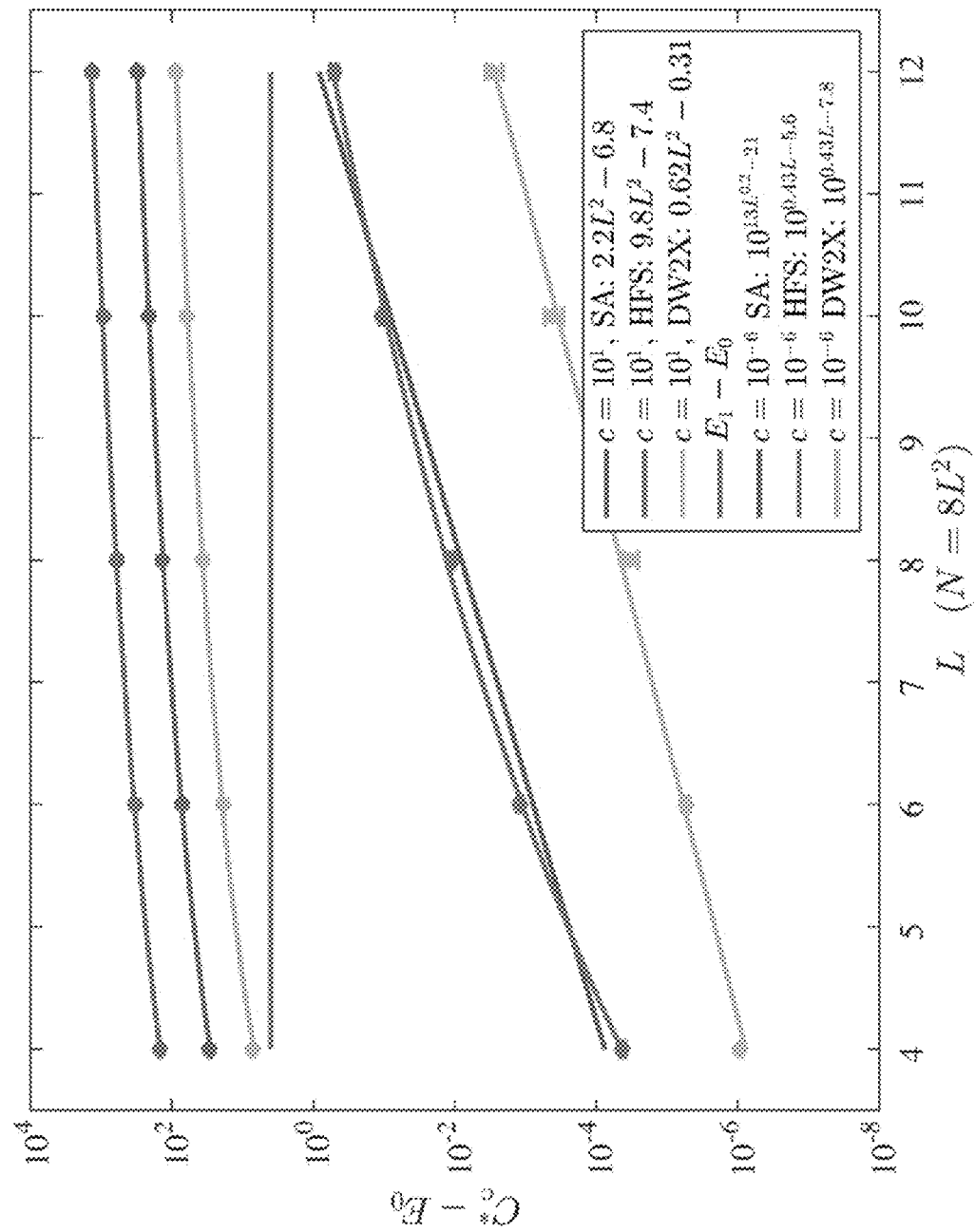
FIG. 5B. Scaling of the optimal total cost for SA, HFS and DW2X as a function of the problem size for $c=10^{-6}$ (below the horizontal line) and $c=10^{-1}$ (above the horizontal line). The horizontal line $C_c^*=E_1$ separates the regions of exponential (below the line) and linear (above the line) scaling. Notice that DW2X and HPS have a similar exponential scaling, while SA scales as a stretched exponential.

In FIG. 5B we compare the scaling of $C_C^*$ for the various solvers and two values of the unit cost parameter c, probing the regimes $C_c^* < E_1$ and $C_c^* > E_1$ (as defined in Sec. IV). In the former regime the difference between the optimal total cost and the global minimum scales exponentially with the problem size. The scaling coefficients for the three solvers are very similar, with SA having a slightly worse scaling coefficient. In the other regime the scaling is linear in the number of variables. This is due to the feet that, unlike the case of the previous section, the energy spread is linear in the problem size for the instances considered here: $E_{2^N} - E_0 \sim N \sim L^2$. Numerical fits give us the following scaling behavior tor the optimal total cost:

$$C_c^*(N) \sim \begin{cases} \alpha e^{\beta L^\delta} & C_c^* > E_1 \\ \gamma L^2 + \omega & C_c^* > E_1 \end{cases} \quad (24)$$

similar to the scaling result obtained for the class of instances considered in Sec. IV. The numerical values of the corresponding fitting parameters are reported in the legend of FIG. 5B.

A well-known caveat is that the scaling of the DW2X processor can only be considered to be a lower bound for the true scaling. This is due to the fact that the annealing time t_DW is not optimized as a function of the problem size but rather fixed at its minimum value allowed by the current technology. It is expected that reducing the minimum annealing time on quantum annealers such as the DW2X will improve their prefactor α but worsen their scaling behavior (increasing the exponential prefactor β), since the latter is artificially boosted by taking too long to solve small-size problems.

We conclude this section b v further commenting on the comparison between classical solvers, which run on standard CPUs, and quantum optimization, which requires dedicated hardware. Using optimal total cost naturally allows us to take into account the cost of the hardware which is necessary to utilize each optimizer to perform a fair practical comparison. As an illustrative example, we can assume that the cost of performing a classical computation is negligible while we have to pay an additional premium $c_{qp}$ to perform a computation on a quantum processor: $c \mapsto c + c_{qp}$. In our example, the parameter c is solver independent (it depends on the application), A premium $c_{qp}$ has the effect of shifting the curves in FIG. 5A to the left. A left shift for the DW2X processor, for example, would make the classical solvers more competitive.

VI. OPTIMAL USE OF A RANDOMIZED OPTIMIZER

In the previous sections, we have interpreted benchmarking as a process to determine the energy distribution P(e) with the required confidence to compute $C_c^*$. In practical applications, however, one must start the optimization process without a precise knowledge of the P(e). In the initial stages of the computation the determination of $C_c^*$ will not be very precise. During the optimization process, as more data is collected, one updates the knowledge of P(e) to refine the calculation of the optimal total cost.

The calculation of the optimal total cost will depend on the previously observed energies and is updated every time a new solution is retrieved. Thus, Eq. (6) is replaced by:

$$C^*_{c,n} : \int_{-\infty}^{C_{c,n}^*} (C_{c,n}^* - e) P_n(e) de = ct_{run} \quad (25)$$

where $P_n(e)$ is our estimate of the quality distribution after n energies have been retrieved from the optimizer. Note that a stopping decision based on incomplete knowledge of P(e) will necessarily be suboptimal. Any practical application of the optimal stopping approach will thus achieve an average cost larger than or equal to the ideal cost possible with full knowledge of P(e).

It is important to note that at every stage of the computation, the learning process involves inferring the probability to observe solutions with energy smaller than all other previously observed solutions. It is easy to see why this is the case. A stopping rule solely based on the so-far observed empirical distribution $P_n(e)$ necessarily calls for stopping at every stage. This is because the so-far observed lowest energy is empirically interpreted as the global solution, suggesting (incorrectly) that there is no advantage in continuing with the optimization process.

As we have shown above, for large values of c the value of the optimal total cost $C_c^*$ is determined by the mean of the energy distribution [recall Eq. (20)]. We expect this quantity to be estimated fairly well even with a small number of observations. This is important because for large values of c it is optimal to stop after a small number of observations. On the other hand, for small c the optimal total cost is dominated by the behavior of the lower tail of the energy distribution. The experimental determination of the tail of a distribution requires, by definition, the collection of a large sample of energies. Fortunately, for small c we expect: that it is optimal to stop only after a typically large number of energies is observed. This allows us to perform a tail inference analysis of P(e).

The observations above suggest the implementation of the following strategy for the optimal use of a randomized optimizer. During an initial "burn-in" regime, when the number of energies collected is small, $C_c^*$ can be obtained by inferring the general shape of the energy distribution P(e). We have considered two approaches. In one case, at each step of the burn-in regime a parametric maximum-likelihood fit is used to estimate P(e). In the other case, knowledge of P(e) is updated in a Bayesian manner. The latter case would be more appropriate when some prior knowledge of the energy distribution is available. In the "asymptotic" regime a large number of energy samples is available. In this regime the optimal total cost can be estimated with an inference of the lower tail of P. Tail inference could be performed, e.g., via a maximum-likelihood fit with Pareto distributions.

A. Burn-In Regime

1. Maximum-Likelihood Fits

This approach to the burn-in regime requires the choice of a parametric representation $P(e|\alpha_i)$ of the quality distribution, where the parameters $\alpha_i$ are determined via a maximum-likelihood fit. We thus determine the time-dependent optimal total cost $C_{c,n}^*$ using the energy distribution:

$$P_n(e) = P(e|\overline{\alpha}_{i,n}) \quad (26)$$

where $\overline{\alpha}_{i,n}$ are the maximum-likelihood estimations of the parameters $\alpha_i$ after n observations. In general we expect that to the burn-in regime $C_c^*$ is mostly determined by the first moments of the energy distribution. Simple choices should thus work well (for example parametric distributions with only the first few non-vanishing moments). Note that we must assume that the discrete distribution P is "well-behaved", e.g., it can be well-described by discretizing a smooth, continuous probability distribution.

2. Bayesian Updates

A Bayesian approach to the burn-in regime can be preferable when one has prior knowledge of P(e). This prior knowledge could have been acquired, e.g., by previously solving other similar optimization problems. Following the Bayesian approach the energy distribution is now expressed in terms of a parametric function $P(e|\alpha_i)$, with the parameters also distributed according to a prior distribution $\mathcal{D}(\alpha_i|\upsilon_\alpha)$, which encodes our prior knowledge of P(e) and depends parametrically on a further set of hyperparameters $\upsilon_\alpha$. The prior is updated as usual via the Bayes formula $$\mathcal{D}(\alpha_i|e_1, \ldots, e_n, \upsilon_\alpha) = \frac{P(e_1|\alpha_i) \ldots P(e_n|\alpha_i)\mathcal{D}(\alpha_i|\upsilon_\alpha)}{\int P(e_1|\alpha_i), \ldots P(e_n|\alpha_i) d\alpha_i} \quad (27)$$

After each observation, our best guess for $P_n(e)$ is obtained by marginalizing over the parameters:

$$P_n(e) = \int P(e|\alpha_i) \mathcal{D}(\alpha_i|e_1, \ldots, e_n, \upsilon_\alpha) d\alpha_i \quad (28)$$

An additional advantage of the Bayesian approach is the possibility to work with fully discrete distributions P(e). In many practical applications one can regard P(e) as a multinomial distribution $P(e|\alpha_i)$, with the parameters at $\alpha_i = p_i$ identifying the probability to obtain the energy $e_i$. A convenient choice for the prior distribution $\mathcal{D}(\alpha_i|\upsilon_\alpha)$ is the Dirichlet distribution, which is the conjugate prior of the multinomial distribution. In this convenient setup, Bayesian updates can be easily performed using only algebraic operations.

B. Asymptotic Regime: Tail Inference with Pareto Distributions

In one of its possible formulations, the theorem of extreme values states that, under very general assumptions, the tail of a given distribution is well-approximated by an element of a three-parameter family of distributions known as Generalized Pareto Distributions: $\mathcal{GPD}(e, \lambda, k, \mu)$. In the asymptotic regime we define $P_n(e)$ as the following piecewise probability distribution:

$$P_n(e) = \begin{cases} \mathcal{GPD}(e, \overline{\lambda}_n, \overline{k}_n, \mu_n) & e \leq \mu_n \\ P_{emp,n}(e) & e > \mu_n \end{cases} \quad (29)$$

The parameters $\overline{\lambda}_n$ and $\overline{k}_n$ are estimated via maximum-likelihood after each observation, while $\mu_n$ is a conveniently chosen threshold that defines the tail of the empirical distribution $P_{emp,n}(e)$ that is substituted by the $\mathcal{GPD}$ fit. The choice of the threshold $\mu_n$ is crucial to obtain a good tail inference via $\mathcal{GPD}$ [32]. The threshold has to be as small as possible in order for the $\mathcal{GPD}$ to model the tail of P(e) with the smallest possible bias. On the other hand, $\mu_n$ should also be large enough so that a sufficient number of observations is used for the maximum-likelihood fit of the parameters of $\mathcal{GPD}$.

C. Numerical Experiments with Optimal Stopping

We performed optimal stopping experiments to study how close to the ideal optimal total cost is the average cost obtained by implementing the strategy described in the previous subsections. We assume that the empirical distribution obtained after $10^7$ SA runs is the exact distribution $P(e) = P_{emp,10^7}(e)$. Under this assumption, each of the outcomes of independent SA runs can be reproduced by a random sampling of $P_{emp,10^7}(e)$. This approximation is crucial to keep the computational time manageable.

1. Maximum-Likelihood and Pareto Fits

Each optimal stopping experiment is performed as follows. We build a sequence of observations $\{e_1, \ldots, e_n\}$ via random sampling. We define a burn-in regime $1 \le n \le 500$ and an asymptotic regime n>500. In the burn-in regime, $P_n(e)$ is determined by fitting a Gaussian distribution via maximum-likelihood, hi the asymptotic regime, we use the distribution defined in Eq. (29), with the parameters $\overline{\lambda}_n$ and $\overline{k}_n$ obtained via a maximum-likelihood fit. The parameter $\mu_n$ is chosen to be the $2 \times 10^4/n$-th percentile of the empirical distribution $P_{emp,n}(e)$. This means that 100 observations are always used in the fit. At each step, $C_{n,c}*$ is computed using the estimated distribution $P_n(e)$ in the optimality equation Eq. (6) and the principle of optimality Eq. (3) is used to determine whether to stop or continue the sequence of observations. While the support of the intrinsic and empirical quality distributions is always compact, the support of the $\mathcal{GPD}$ tail can extend to $-\infty$. This may result in an estimate of the optimal total cost that is smaller than the global minimum ($C_{n,c}* < E_0$) and as a consequence the principle of optimality never calls for stopping. To avoid this situation, we override the principle of optimality with an additional stopping rule, i.e., we stop as soon as the number of observations is large enough that there is a 99% probability that we should already have observed a stopping value. Once stopped, the final cost $C_n = \min(e_1, \ldots, e_n) + nct_{run}$ is recorded. We repeated this process 1000 times to determine the average cost.

Figure 6A:
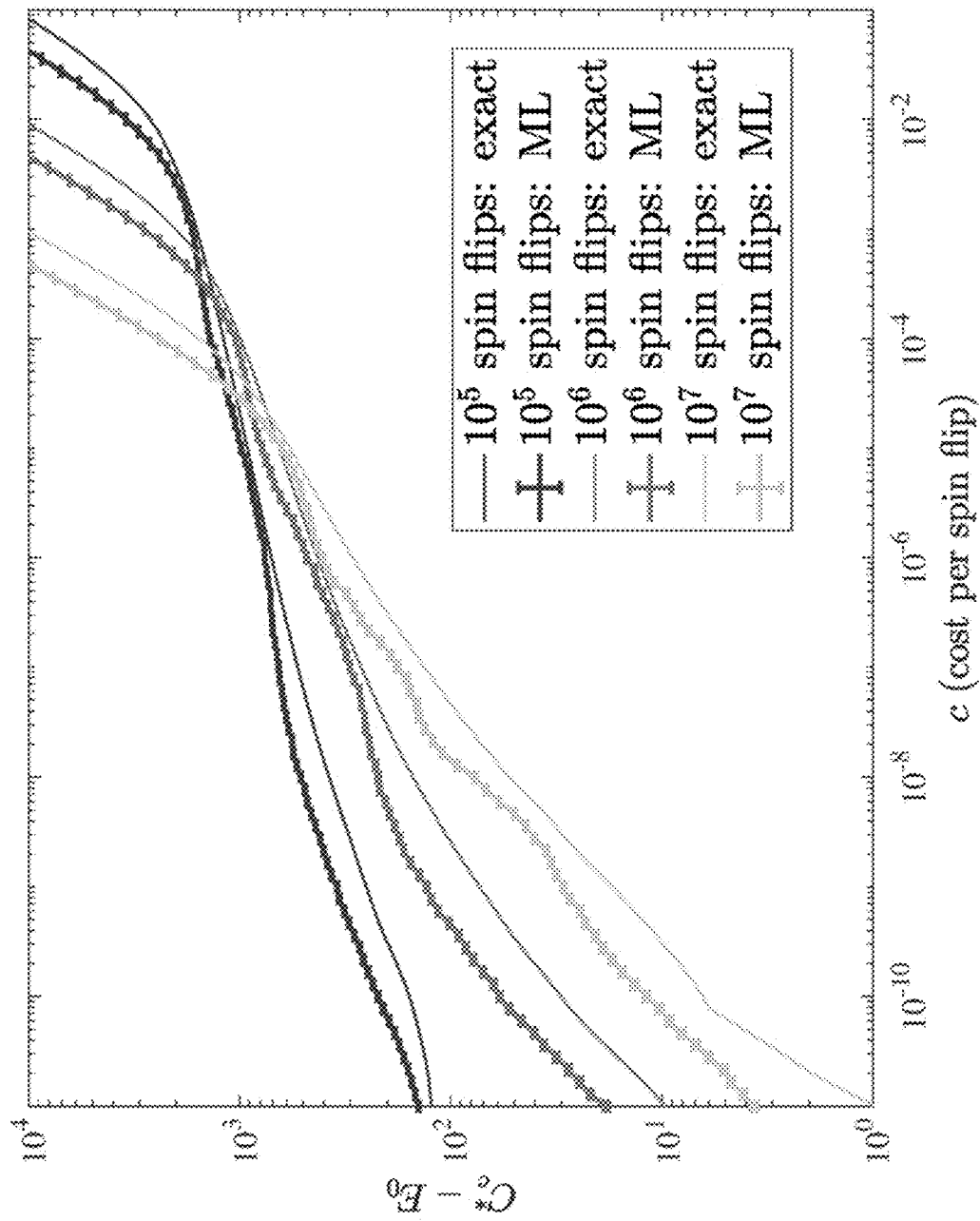
FIGS. 6A and 6B. Ideal (thin lines) and empirical (thick lines) optimal total cost for a representative instance N=1000 variables and for different values of the number of spin updates $n_{sf}$. The empirical optimal total costs are computed for the burn-in regime with FIG. 6A the maximum-likelihood fit method, and FIG. 6B the Bayesian method. For the class of problems studied, the prior knowledge obtained by knowing the behavior of other instances in the same family is good enough to make the Bayesian method almost exact in the large and intermediate c regions.

Numerical results are shown in FIG. 6A for the same random instance as in FIGS. 1A-2B defined on N=1000 variables and for several values of the number of spin updates. The thin lines are the exact optimal total cost computed using $P_{emp,10^7}(e)$ as the energy distribution. The thick lines are the average empirical costs obtained using the method described above. As expected, the empirical costs are larger than the exact costs. Even with our simple approach, however, we were able to obtain empirical costs that satisfactorily reproduce the values of the ideal costs. This demonstrates the viability of the optimal stopping approach for the optimal use of randomized optimizers.

We again identify three regions in FIG. 6A. In the large c region, where it is optimal to stop after one observation, the empirical cost is systematically higher because we need at least two observations to perform a maximum-likelihood fit. In the intermediate c region, the optimal total cost is mainly determined by the overall shape of the energy distribution. In this region it is important that the parametric distribution used for the fit accurately reproduces the quality distribution. We see that even the simple choice of a Gaussian distribution gives reasonably good results. In the small c region the empirical optimal total cost are most likely dominated by the $\mathcal{GPD}$ tail fit. In this regime, however, it is more difficult to assess the effectiveness of our approach, because the tail of the empirical distribution $P_{emp,10^7}(e)$ is not a statistically good approximation of the intrinsic energy distribution P(e).

2. Bayesian Updates

Figure 6B:
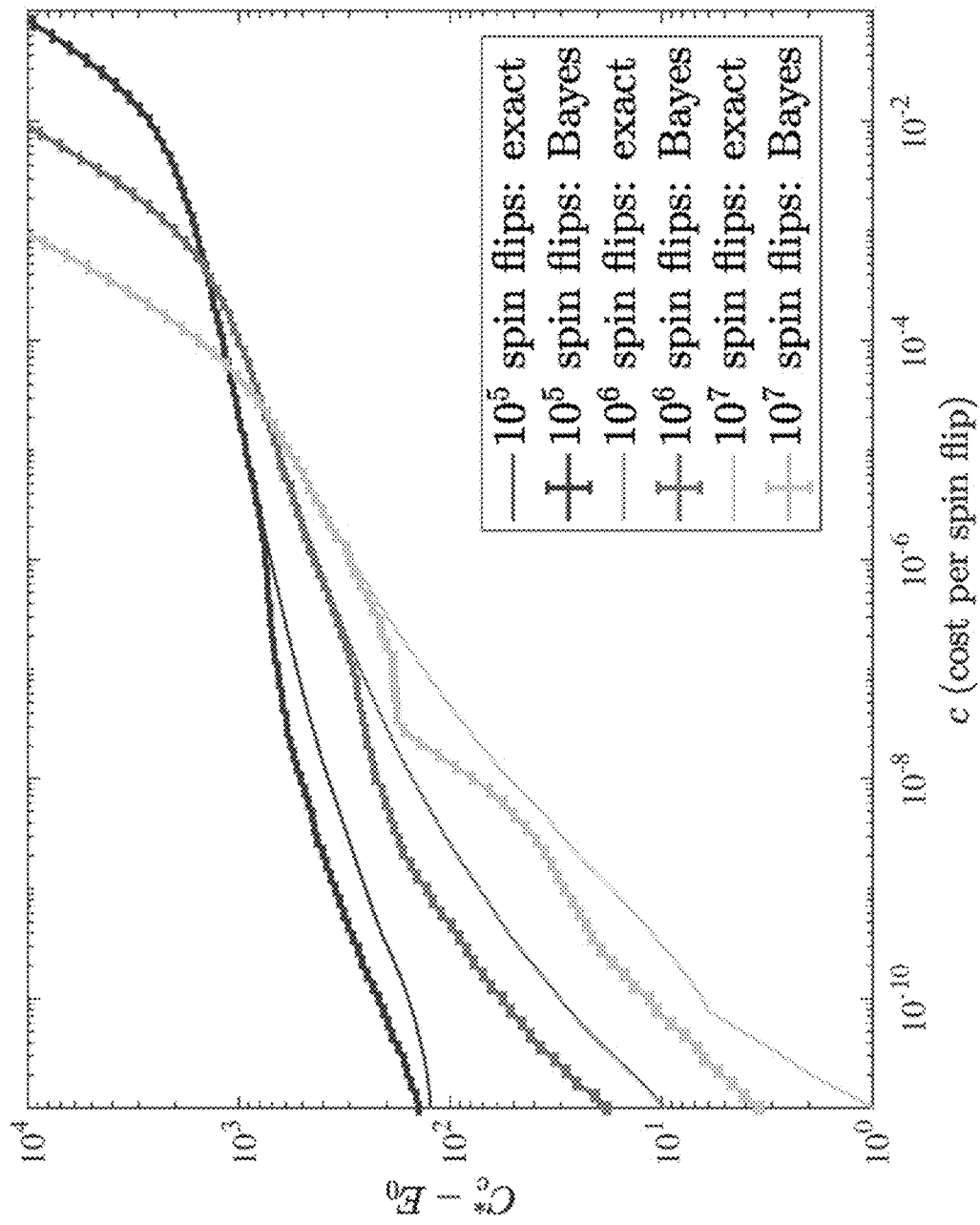

We have also performed similar experiments where the energy distribution $P_n(e)$ is obtained, in the burn-in regime, via Bayesian updates. As prior knowledge for the energy distribution, we used a family distribution $P_{fam}(e)$ obtained by including in the same energy distribution all the energies of all 100 instances in the same family ($10^7$ energies in total). The idea is to use information about a family of similar instances to obtain a better guess of $C_c*$ for a new optimization problem in the same family. The prior we choose is the Dirichlet distribution $\mathcal{D}(\alpha_i | 500 p_{fam,i})$, where $p_{fam,i}$ is the probability to observe the energy $e_i$ from the family distribution $P_{fam}(e)$. Intuitively, this function corresponds to a prior knowledge of 500 "Virtual" observations distributed according to the family distribution. Results are shown in FIG. 6B. We see that in the regions of intermediate and large c values the empirical cost almost exactly matches the exact cost. This is due to the fact that the Bayesian update can be performed after one observation (optimal in the large c region), and that the family distribution used to build the prior is an excellent representation of the exact quality function P(e) for the class of problems considered in this study. Note that the maximum-likelihood and the Bayesian approaches give the same result in the small c region. This is simply due to the fact that in this region stopping occurs after entering the asymptotic regime, which is the same in both cases.

VII. PARALLELIZATION

A. Optimal Parallelization

The optimal stopping approach allows us to carefully address the question of parallelization. SA is an example of a solver that is "embarrassingly" parallelizable, which means that multiple independent runs of the same algorithm can be executed in parallel to speed up the computation. When embarrassing parallelization is implemented, we can assume that the n-th energy observation is given as follows:

$$e_n(n_{cpu}) = \min\{e_{n,1}, e_{n,2}, \ldots, e_{n,n_{cpu}}\} \quad (30)$$

where $n_{cpu}$ is the number of cores, or processes used in the parallelization of the algorithm. A less trivial parallelization can also be implemented in many randomized optimization algorithms to shorten the length $t_{run}$ of a computation. "Perfect" parallelization is achieved when $t_{run} \rightarrow t_{run}/n_{cpu}$. In most cases algorithms cannot be perfectly parallelized. Even when perfect parallelization is possible in theory, practical limitations may only allow for "imperfect" parallelization. We have imperfect parallelization when $t_{run} \rightarrow t_{run}/n_{imp}$ with $1 < n_{imp} < n_{cpu}$.

Figure 7A:
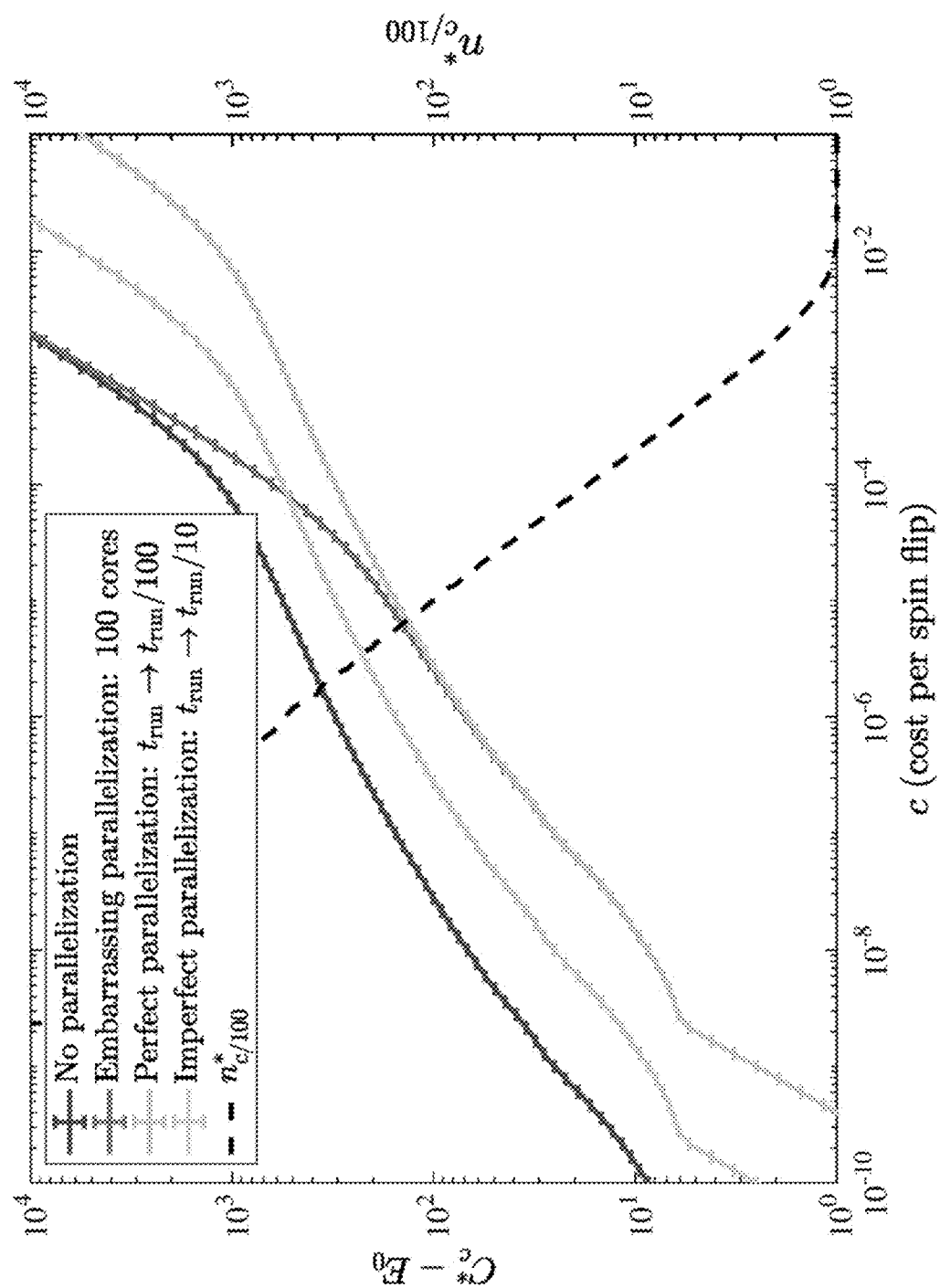
FIG. 7A. Optimal cost for the same instance as in FIGS. 1A and 1B, computed running SA with $5\times10^6$ spin updates and different parallelization strategies. The black dashed line is the optimal stopping step $n_{c/100}^*$ corresponding to perfect parallelization. Embarrassing parallelization is notably worse than perfect parallelization when $n_{c/100}^*<100$.

What is the best parallelization strategy to minimize the total cost? Let us assume for the time being that running multiple parallel processes does not increase the unit cost c. FIG. 7A shows $C_c*$ under this assumption, for the same random instance as in FIGS. 1A and 1B, obtained by running SA using $5 \times 10^6$ spin updates. The top line (left side) is the optimal total cost without parallelization. The middle line (left side) corresponds to a situation where only imperfect parallelization is achievable. Perfect parallelization (bottom line, left side) achieved with 100 cores is equivalent to re scaling $c \rightarrow c/100$ and represents the ideal way of using the available computational resources. We find that embarrassing parallelization (line that splits from bottom line at dashed line that intersects bottom line) performs as well as perfect parallelization in the small c regime. This is an important practical observation: trivial embarrassing parallelization performs as well as ideal but practically unachievable perfect parallelization, in the low unit cost regime.

Figure 7B:
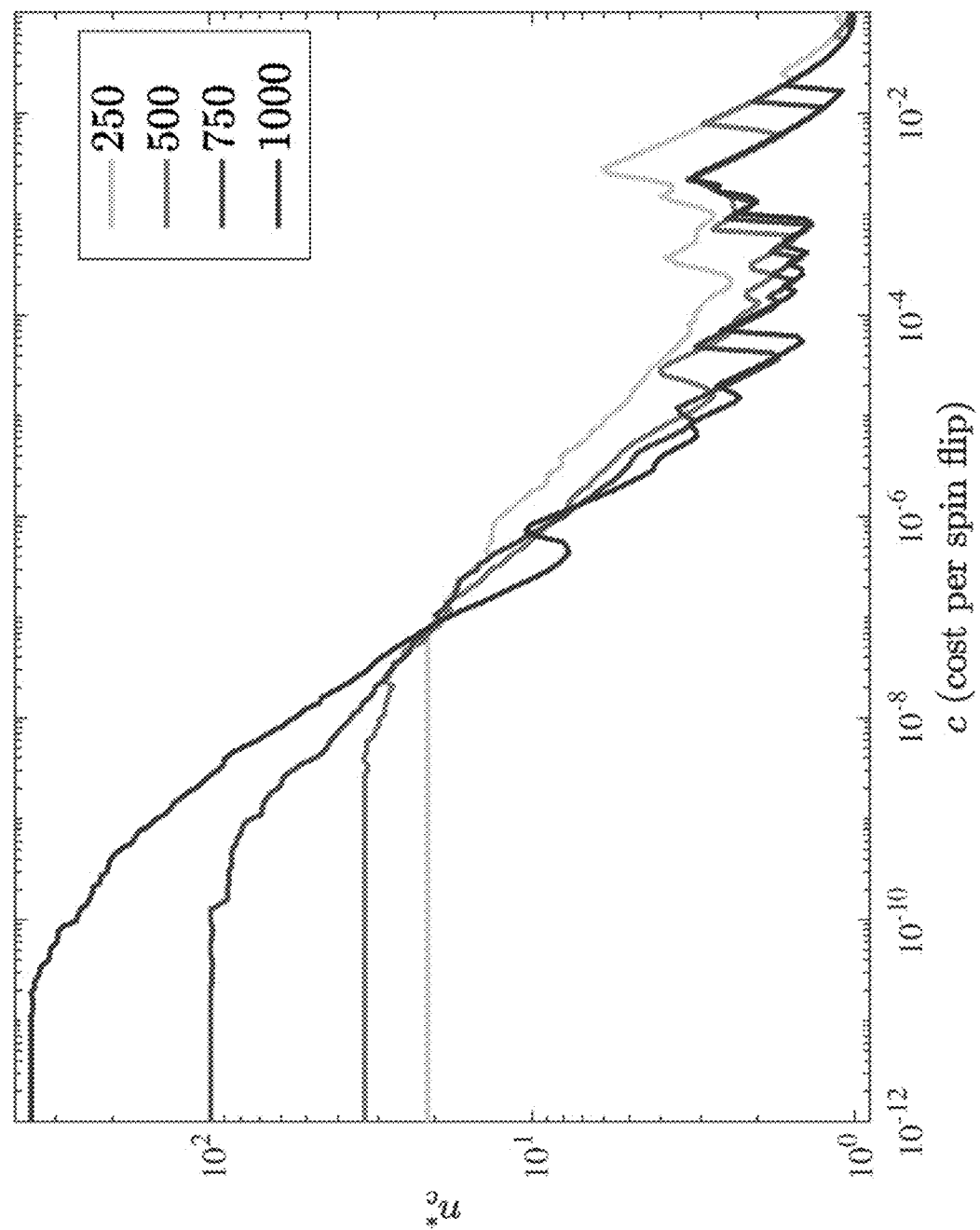
FIG. 7B. Stopping step computed after optimizing the number of spin updates and averaged over the 100 instances of each size N indicated in the legend. According to die discussion in the main text, large values of $n_c^*$ allow for efficient embarrassing parallelization.

For large c, embarrassing parallelization becomes less effective and approaches the performance of the no parallelization result, but stays below it. This is because in the limit of large c, optimal total cost is dominated by the cost of drawing single observations, which is not reduced by embarrassing parallelization. Still, each of the parallel processes returns a single energy before stopping, so embarrassing parallelization yields the minimum energy over the set of cpu samples, while the no parallelization case draws a single sample from the same distribution. Intuitively, embarrassing parallelization becomes essentially equivalent to perfect parallelization when the perfectly parallelized optimal stopping step $n_{c/n_{cpu}}^*$ is larger or comparable to the number of parallel processes, i.e., $n_{cpu} < n_{c/n_{cpu}}^*$, which requires c to be sufficiently small. This observation is confirmed in FIG. 7A which shows how embarrassing parallelization performed with 100 processes starts to perform notably worse than perfect parallelization when $n_{c/100}^*/100$. Thus, a rule of thumb for an optimal parallelization strategy is to use all parallel processes to perform embarrassing parallelization in the limit of small c, when $n_{cpu} < n_{c/n_{cpu}}^*$, or imperfect parallelization in the large c limit, when $1 \equiv n_{c/n_{imp}}^*$. In the intermediate regime parallel processes should be optimally distributed between embarrassing and imperfect parallelization. Embarrassing parallelization can thus be efficiently exploited only if there is a regime where the optimal stopping step $n_c^*$ is large, FIG. 7B shows $n_c^*$ (averaged over 100 instances) for different problem sizes obtained after optimization of the number of spin updates. The optimal stopping step $n_c^*$ grows larger than 1 for larger problem size and small c. As expected, $n_c^*$ is close to 1 in the limit of large c. FIG. 7B shows, e.g., that embarrassing parallelization can be efficiently implemented (i.e., it is equivalent to perfect parallelization) in solving the N=1000 class of problems when the number of parallel processes used is ~300 (and ~20 for the N=250 case). It should then be more effective to use a larger amount of computational resources to implement a certain degree of imperfect parallelization.

We expect these observations to guide future benchmarking studies in giving useful information about parallelization optimization.

B. Optimal Number of Cores

So far we assigned a cost c to the flow of time, but have not taken into account the cost of the hardware resources necessary for parallelization. More generally, we must include the cost of implementing a certain amount of computational resources into the cost function T(t). A simple practical approach is to use the following type of cost function:

$$T(t, n_{cpu}) = (c_t + c_{cpu} n_{cpu}) t_{run} \quad (31)$$

The cost c now comprises two contributions. The term $c_t$ measures a cost that is simply due to the flow of time, and is solver 15 and hardware independent. This term could, e.g., be related to a loss in revenue for a certain business to simply idling while the optimizer is running. The term $c_{cpu} n_{cpu}$ depends on the hardware used and is proportional to the number of cores used. This term may include, for example, utility bills, maintenance or rent costs that scale linearly with the size of the cluster. Equation (31) can be viewed as defining the cost c for a parallelized version of a given solver, with the parameter $n_{cpu}$ being interpreted as an additional parameter to be optimized in order to minimize the total cost $C_{c_t c_{cpu}}^*(n_{cpu})$, which is now considered a function of $n_{cpu}$.

In the previous subsection we showed that, for sufficiently small $c = c_t + c_{cpu} n_{cpu}$, embarrassing parallelization is practically equivalent to perfect parallelization. We thus have that for sufficiently small $c_t + c_{cpu} n_{cpu}$ parallelization is equivalent to the rescaling $c_t + c_{cpu} n_{cpu} \to c_t/n_{cpu} + c_{cpu}$. This cost is monotonically decreasing in $n_{cpu}$. Because the optimal total cost is a monotonic function of the unit cost c, it follows that it is optimal to increase $n_{cpu}$ at least as long as the embarrassing parallelization process is effective, i.e., as long as $n_{cpu} \sim n_{c/n_{cpu} + c_{cpu}}^*$. As explained in the previous subsection, a larger number of cores can be optimal if a certain degree of imperfect parallelization is possible. An important observation is that when the cost per CPU $c_{cpu}$ is included, even the efficacy of perfect parallelization is greatly reduced when $c_{cpu}$ is large. The effective unit cost converges to $c_t/n_{cpu} + c_{cpu} \to c_{cpu}$, with the optimal total cost converging to $C_{c_{cpu}}^*$ with no further improvement. This limiting value is uniquely determined by the unit hardware cost $c_{cpu}$ and has a simple intuitive explanation: including the cost of the hardware in the unit cost places a practical limit on the amount of hardware resources that should be implemented in solving an optimization problem. In general, the optimal number of cores $n_{cpu}^*(c_t, c_{cpu})$ will depend on the specific solver, instances, and cost function considered, and should be estimated by performing benchmarking studies similar to those presented here.

VIII. CONCLUSIONS

We have presented an optimal stopping approach to benchmarking randomized optimization algorithms. Rather than focusing, as is customary, an optimizing solution quality (e.g., minimizing the energy) alone, we considered the more general problem of optimizing solution quality along with the associated cost of obtaining samples of the fitness function. This approach is natural given that the cost of more samples grows with time, so that the total cost should account for the fitness function along with the latter cost. We have shown that this problem lends itself naturally to an analytical solution within the framework of optimal stopping theory, and can be recast as the well-known "house-selling" problem, under the assumption that samples are statistically independent random variables. This approach yields both the optimal stopping time and the optimal total cost [Eqs. (3) and (6), respectively]. Moreover, our optimal stopping approach includes as special cases all the standard variants of randomized benchmarking, including time-to-solution, time-to-target, average energy, and target-in-time.

To find the optimal stopping time, at which a round of randomized benchmarking concludes and one settles for the lowest energy solution obtained thus far, requires knowledge of the quality (e.g., energy) distribution. We have shown how this distribution can be found on the fly using either maximum likelihood fits or Bayesian updates, and by inferring the occurrence of rare samples using the theory of generalized Pareto distributions. This demonstrates that optimal stopping criteria lead to an optimal-utilization strategy of randomized optimization algorithms that can be successfully used in practical scenarios, which improve the way in which processors operate to find optimal stopping time and optimal total cost.

Some of our key findings, based on studying MAX2SAT problems over complete graphs and problems with planted solutions on the Chimera graph (using simulated annealing, quantum annealing using the D-Wave 2X device, and the HPS algorithm) can be summarized as follows:

As the unit cost (the cost per operation) increases, the run-time must be lowered, i.e., the optimal run-time depends on the unit cost, as exemplified in FIG. 1B. After optimization of the run-time, optimal total returns give the optimal trade-off between computational time and solution quality, as shown in FIG. 2B.

Hard optimization problems exhibit exponential scaling with problem size of the optimal total cost only in the regime of small unit cost. When the unit cost is sufficiently high, the total cost for such optimization problems instead exhibits polynomial scaling [see FIG. 3D]. This is a consequence of the optimal stopping criterion, which favors stopping before the lowest energy is found, when the unit cost is high.

Assuming equal unit cost, we find that the D-Wave 2X quantum annealer outperforms both simulated annealing and the HFS algorithm run on a single CPU core by a factor of ~100 in terms of the total cost [see FIG. 5B]. This should not be seen as a claim of quantum speedup (e.g., because it is difficult to assign consistent unit costs across different technologies), but rather as an encouraging sign for quantum annealing that it can be competitive with the best classical optimization heuristics.

Optimal total cost provides a precise criterion for optimal parallelization strategies. We found that, in the low unit cost regime, "embarrassing parallelization" performs as well as ideal, but practically unachievable, perfect parallelization. In the large unit cost regime, on the other hand, even imperfect parallelization (to reduce the run-time of the algorithm) is preferable. In the intermediate unit cost regime, embarrassing and imperfect parallelization should be optimally balanced to minimize the optimal total costs [see FIG. 7A].

We hope that our approach to benchmarking randomized optimization algorithms, which balances optimizing the objective function with the computational cost of optimization, will inspire future investigations into this important tradeoff, and will result in an appreciation of the useful role optimal stopping theory can play in heuristic optimization.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An optimally stopped heuristic optimizer comprising:
a processor programmed to
heuristically generate a sequence of proposed solutions for solving a discrete optimization problem associated with an objective function,
for each additional proposed solution of the sequence, derive an estimate of a quality distribution that is based on the sequence including the additional proposed solution, and that assigns a probability to each of the proposed solutions according to quality of the proposed solution, and
responsive to a most recent additional proposed solution of the sequence having quality better than a quality threshold that is defined by the estimate corresponding to the sequence including the most recent additional proposed solution,
command a stop of computing resources of the processor such that further proposed solutions to the discrete optimization problem are no longer generated by the computing resources, and
identify and output a selected one of the sequence having best quality,
wherein the quality of the most recent additional proposed solution is an energy of the most recent additional proposed solution, and the quality threshold is an energy threshold.

2. The optimizer of claim 1, wherein a quality better than the quality threshold is an energy less than the energy threshold.

3. The optimizer of claim 1, wherein the most recent additional proposed solution of the sequence is the selected one.

4. The optimizer of claim 1, wherein the processor is further programmed to derive the estimate via maximum likelihood estimation.

5. The optimizer of claim 1, wherein the processor is further programmed to derive the estimate via Bayesian estimation.

6. The optimizer of claim 1, wherein the processor is further programmed to derive the estimate via generalized Pareto distributions.

7. A method optimally stopping a heuristic optimizer, comprising:
by a processor,
heuristically generating a sequence of proposed solutions for solving a discrete optimization problem associated with an objective function,
for each additional proposed solution of the sequence, deriving an estimate of a quality distribution that is based on the sequence including the additional proposed solution, and that assigns a probability to each of the proposed solutions according to quality of the proposed solution, and
responsive to a most recent additional proposed solution of the sequence having quality better than a quality threshold that is defined by the estimate corresponding to the sequence including the most recent additional proposed solution,
commanding a stop of computing resources of the processor such that further proposed solutions to the discrete optimization problem are no longer generated by the computing resources, and
identifying and outputting a selected one of the sequence having best quality,
wherein the quality of the most recent additional proposed solution is an energy of the most recent additional proposed solution, and the quality threshold is an energy threshold.

8. The method of claim 7, wherein a quality better than the quality threshold is an energy less than the energy threshold.

9. The method of claim 7, wherein the most recent additional proposed solution of the sequence is the selected one.

10. The method of claim 7 further comprising deriving the estimate via maximum likelihood estimation.

11. The method of claim 7 further comprising deriving the estimate via Bayesian estimation.

12. The method of claim 7 further comprising deriving the estimate via generalized Pareto distributions.

* * * * *

UNITED STATES PATENT AND TRADEMARK OFFICE
CERTIFICATE OF CORRECTION

PATENT NO. : 11,308,400 B2
APPLICATION NO. : 16/105840
DATED : April 19, 2022
INVENTOR(S) : Daniel A. Lidar et al.

It is certified that error appears in the above-identified patent and that said Letters Patent is hereby corrected as shown below:

In the Specification

Column 1, Lines 20-21:
After "National Science Foundation Grant No."
Delete "INSPIRE-155.1064"
Insert --INSPIRE-1551064--.

Signed and Sealed this
Twenty-first Day of February, 2023

Katherine Kelly Vidal
*Director of the United States Patent and Trademark Office*